United States Patent
Bober et al.

(10) Patent No.: US 9,396,667 B1
(45) Date of Patent: *Jul. 19, 2016

(54) AUTOMATED VEHICLE SIMULATION TRAINING SYSTEM

(71) Applicants: Paul Michael Bober, Glendale, AZ (US); David M. Duncan, Cave Creek, AZ (US)

(72) Inventors: Paul Michael Bober, Glendale, AZ (US); David M. Duncan, Cave Creek, AZ (US)

(73) Assignee: Paul Michael Bober, Glendale, AZ (US)

( * ) Notice: Subject to any disclaimer, the term of this patent is extended or adjusted under 35 U.S.C. 154(b) by 460 days.

This patent is subject to a terminal disclaimer.

(21) Appl. No.: 13/941,144

(22) Filed: Jul. 12, 2013

Related U.S. Application Data

(63) Continuation-in-part of application No. 13/868,288, filed on Apr. 23, 2013.

(60) Provisional application No. 61/687,621, filed on Apr. 30, 2012.

(51) Int. Cl.
*G09B 9/058* (2006.01)

(52) U.S. Cl.
CPC .................................. *G09B 9/058* (2013.01)

(58) Field of Classification Search
USPC ............................................................ 434/61
See application file for complete search history.

(56) References Cited

U.S. PATENT DOCUMENTS

| | | | |
|---|---|---|---|
| 3,940,978 A * | 3/1976 | Akkerman et al. | 73/116.09 |
| 4,978,300 A * | 12/1990 | Letovsky et al. | 434/61 |
| 6,733,294 B2 * | 5/2004 | Tuluie et al. | 434/61 |

* cited by examiner

*Primary Examiner* — Robert J Utama
*Assistant Examiner* — Elroy S Crocker
(74) *Attorney, Agent, or Firm* — Plager Schack LLP

(57) ABSTRACT

Some embodiments provide an automated training system configured for use with two-wheeled automotive vehicles for permitting a user to operate a two-wheeled automotive vehicle on the system in a manner that simulates actual operation on a road or dirt pathway and incorporating kinesthetic sensory input to a person seated on and operating the automotive vehicle as part of an effort to learn how to operate the automotive vehicle safely and effectively in a controlled off-road environment. In some embodiments, the automated training system supports a real motorcycle. In some embodiments, the automated training system comprises an electronic actuator configured to actuate a piston within a cylinder in order to simulate realistic operation of the motorcycle as if it were being operated on a road or dirt pathway.

7 Claims, 13 Drawing Sheets

AUTOMATED VEHICLE SIMULATION TRAINING SYSTEM

RELATED APPLICATIONS

This application is a continuation-in-part of U.S. Ser. No. 13/868,828 filed Apr. 23, 2013, which claims the benefit of U.S. Provisional Application No. 61/687,621 filed on Apr. 30, 2012, both of which are incorporated herein by reference.

BACKGROUND

Riding a motorcycle requires a great amount of knowledge to effectively operate any of several different controls. Additionally, a strong kinesthetic sense of motorcycle dynamics must be developed and honed for riders to perform any of several different motorcycle maneuvers. Typically people who would like to learn to ride motorcycles lack both the knowledge and physical awareness necessary to safely learn motorcycle riding skills. In particular, new or novice motorcycle riders have not yet experienced or do not know how to shift, turn, lean, counter weight, or counter-steer as these are things cannot be experienced by driving multiple-track vehicle (e.g., a car with a pair of wheels on each of two sides of the car). This lack of experience makes for a steep and dangerous learning curve as well as heightened stress levels by the student rider. The elevated stress levels make for diminished learning situations. Therefore, a variety of motorcycle riding instructions are available for learning and/or improving motorcycle riding skills, including visual instruction media and live teacher-based instruction.

While general knowledge of motorcycle operation using a set of controls is readily available and easily absorbed from visual instruction media (e.g., books, video, animations, etc.), it is exceedingly difficult for a person to develop a physical sense of riding a motorcycle by merely viewing visual instruction media. For instance, a person can read a motorcycle instruction manual to learn to rotate the motorcycle's handlebar grip upward to accelerate and downward to decelerate. However, many motorcycle riding maneuvers would appear to be illogical and counter-intuitive if merely read in a motorcycle riding instruction manual (or for that matter, viewed in a video, etc.). The difficulty of expressing a set of instructions for executing a safe motorcycle maneuver is somewhat akin to the difficulty many sick patients have in describing how sick they feel (e.g., on a scale of 0-10, how sick do you feel?). A sick person simply has a sense that they are sick, but quantifying that feeling would seem to be an absurd oversimplification that fails to express any meaningful information. Likewise, a book or video cannot teach a person how it feels to properly lean into a turn or come to a quick and complete stop.

Thus, many people learn motorcycle riding skills with a live instructor who sits on the motorcycle with a student during an instructional session that typically occurs outside on a paved street or parking lot. Although it is possible to acquire some tactile sense of motorcycle dynamics in this instructional way, there are a variety of problems that make this approach problematic for many people. In particular, the learning environment is often an uncontrolled outdoor environment that is prone to weather and natural phenomena (e.g., a sudden rainfall occurs making the pavement slick and unsafe, the wind blows dust into a student rider's face, etc.). Furthermore, the outdoor learning environment may be unsuited for particular motorcycle maneuvers (e.g., parking lot is too small to ride the motorcycle at normal street speeds, etc.). Thus, the instruction provided by live teachers in outdoor learning environments is often inadequate. This is problematic for people who can learn about the different controls of a motorcycle through books, video, and/or instruction, but who cannot acquire an adequate kinesthetic riding sense that concrete tactile stimulation provides.

To date, these problems have not been resolved. The U.S. Pat. No. 4,978,300, issued to Letovsky et al. ("Letovsky"), discloses a motorcycle simulator that provides six degrees of movement freedom to realistically simulate a high performance motorcycle during operation. However, Letovsky's simulator includes a non-operational frame of a motorcycle and none of the components are included to hydraulically assist in simulating the riding experience. U.S. Pat. No. 3,686,776, issued to Dahl, describes a motorcycle riding simulator. However, the simulator disclosed in Dahl uses a center post supporting structure and includes a treadmill-like rolling mat on which a motorcycle is placed for simulated operation. Thus, none of these references have disclosed a supports a motorcycle in a stationary upright position for learning motorcycle riding skills, as provided in this specification.

SUMMARY

Some embodiments of the invention provide a novel automated training system configured for use with two-wheeled automotive vehicles for permitting a user to operate a two-wheeled automotive vehicle on the system in a manner that simulates actual operation on a road or dirt pathway and incorporating kinesthetic sensory input to a person seated on and operating the automotive vehicle as part of an effort to learn how to operate the automotive vehicle safely and effectively in a controlled off-road environment. In some embodiments, the automated training system comprises (i) a support base to a two-wheeled automotive vehicle in a manner that permits operation of the vehicle but precludes forward movement of the vehicle during operation, (ii) a front wheel support system that secures the front wheel of the two-wheeled automotive vehicle and permits the person to turn the front wheel radially during operation, (iii) a rear wheel support system that secures the rear of the two-wheeled automotive vehicle and allows the rear wheel to rotate as power is applied by the person to the vehicle, (iv) a vehicle frame position control system that controls the vertical orientation of the vehicle on the base and permits a vehicle user to lean the vehicle to one side or the other during simulation, and (v) a control system configured to process information gathered from one or more sensors and configured to be programmed to simulate realistic operation of the vehicle as if it were being operated on a road or dirt pathway.

In some embodiments, the automated training system comprises a hydraulic circulation system configured to actuate a piston within a cylinder. In some embodiments, the automated training system comprises an electronic actuator configured to actuate a piston within a cylinder.

BRIEF DESCRIPTION OF THE DRAWINGS

Having described the invention in general terms, reference is now made to the accompanying drawings, which are not necessarily drawn to scale, and wherein.

DETAILED DESCRIPTION OF CERTAIN EMBODIMENTS

Figure 1:
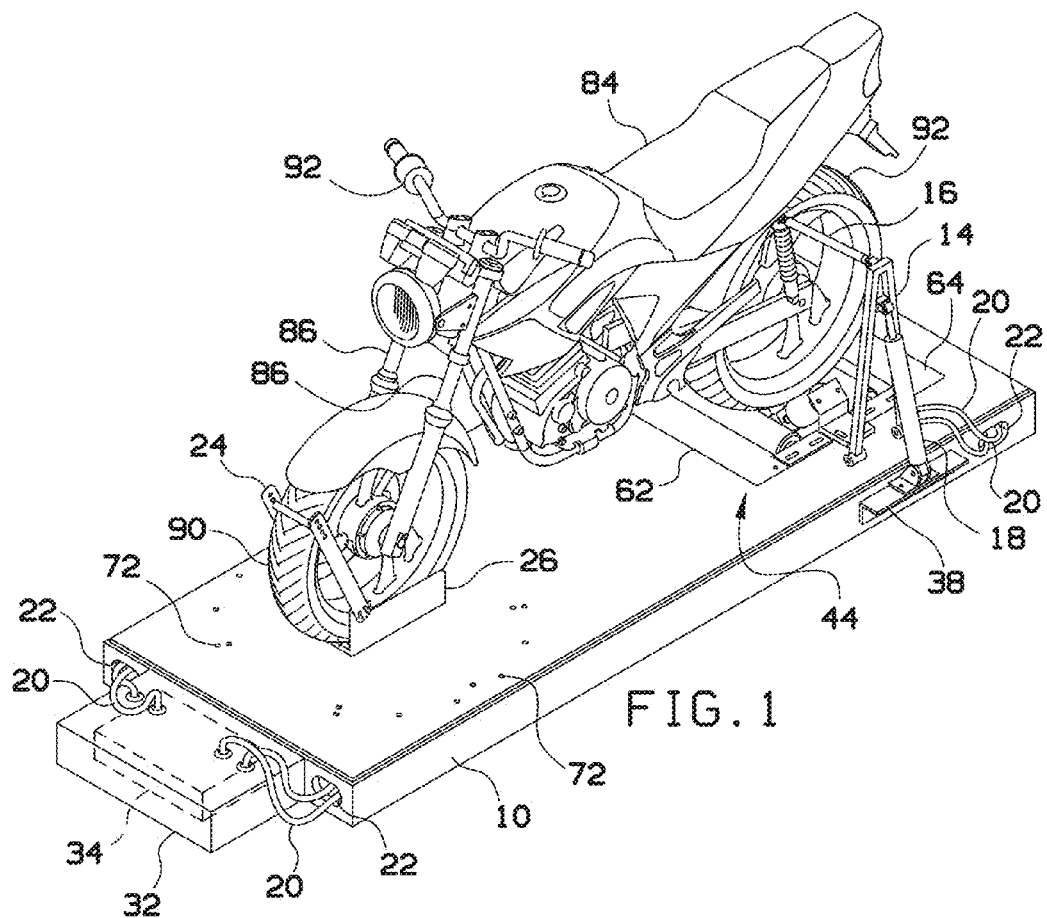
FIG. 1 shows a perspective view of one embodiment of the invention in use with a two-wheeled vehicle, such as a motorcycle.

In some embodiments of the present invention, an automated training system is provided that is configured to support a two-wheeled vehicle, such as a motorcycle, in an upright position for learning riding skills. When a student rider is seated on and operates a set of controls of the vehicle, embodiments of the automated training system simulate a motorcycle riding experience in response to operational selections of the rider. For example, the rider may perform a variety of vehicle maneuvers (e.g., turning the handlebars, accelerating, braking, etc.) to which the automated training system embodiments respond so as to simulate the feel of the vehicle as it would feel when actually ridden on the road or dirt pathway. In other words, operational responses are provided that give rise to physical sensations, which when felt by the rider, can enhance the rider's intellectual understanding and kinesthetic sense of motorcycle dynamics. In this way, when the vehicle is operated in a particular way (e.g., steering the front wheel while moving a high speeds), embodiments of the system are configured to respond to the rider maneuvers by acting on the vehicle so that the rider is able to experience physical sensations that arise from operating the vehicle in such a particular manner.

For example, a student rider attempting to steer a motorcycle left while maintaining a speed of approximately 25 miles per hour may intuitively believe that negotiating this maneuver successfully involves simply turning the handlebars to face slightly to the left. In this example, the student would experience great difficulty leaning into the turn, and may ultimately fail to steer the motorcycle left. Upon experiencing the difficulty in steering this way, the student's instructor could then teach the student a technique for making the turn, such as counter steering. As counter steering involves an initial handlebar movement that is counter-intuitive (i.e., turning the handlebars slightly right to steer to the left), most students would not think of doing it, and even if instructed to do so by a motorcycle riding instructor, most students would be hesitant to even try such a maneuver in an uncontrolled environment (e.g., an actual paved street or parking lot).

Embodiments of the present invention provide simulation in one of numerous possible ways. In some embodiments, sensors are provided to monitor various positions and/or rotational speeds of the vehicle, and then adjust the vehicle to simulate how the vehicle would feel to the rider under such positions and speeds. Actuation of the simulation systems may be via a hydraulic circulation system, for example, in which the vehicle may be moved side to side by use of a hydraulic cylinder secured to the frame of the vehicle. In other system embodiments, simulation may be provided via an electronic actuator to control the vertical orientation of the vehicle. In either case, or other cases involving other means of actuation, a control system is provided with at least one or more sensors to detect vehicle position and wheel rotational speed and then direct movement of the vehicle to simulate how the vehicle would react under conditions detected by the sensors.

The automated training system embodiments provide a simulated sense of inertial forces that arise naturally from vehicle maneuvers of a non-stationary vehicle, although the vehicle is actually secured to the system in a controlled environment. With such operational features and constraints, some of which are identified herein, the student vehicle rider may practice one of several maneuvers (e.g., fast and slow accelerating and decelerating, controlled turning, high speed turning, etc.) in a controlled environment that can be supervised by an instructor.

Referring to FIG. 1, for example, in some embodiments, the automated training system comprises a training deck 10, a set of rear control arms 14, a set of struts 16, a set of hydraulic cylinders 18, a plurality of hydraulic lines 20, a plurality of hydraulic line cutouts 22, a set of adjustable wheel safety arms 24, a front wheel chock 26, a hydraulic tank 32, a control system 34, a set of deck hydraulic cylinder mounting brackets 38, a rear roller assembly 44, front and rear removable deck plates 62 and 64, a set of turntable mounting ring screw holes 72, a motorcycle 84, a set of motorcycle front forks 86, a motorcycle front tire 88, a motorcycle rear tire 90, and a set of motorcycle handlebars 92.

The motorcycle 84 used with the automated training system in some embodiments is a fully-functional motorcycle with a full set of operational controls. The motorcycle 84 further includes a set of motorcycle front forks 86, front and rear motorcycle tires 88 and 90, respectively, and the set of motorcycle handlebars 92. In some embodiments, any type of motorcycle can be used with the automated training system. For instance, the motorcycle can be a street motorcycle, a racing motorcycle, an off-road motorcycle, or any other type of single-track motorcycle.

The training deck 10 in some embodiments of the automated training system provides a mounting surface for all components of the training device. In some embodiments, the training deck 10 includes an engineered framework of dimensional rectangular steel tubing welded to form a large rectangle with internal bracing. The corners and joints in some embodiments are engineered for strength and rigidity. In some embodiments, strength and rigidity is provided by a set of welded compound miter joints used for the corners and joints of the training deck 10. On top of the steel framework of the training deck 10 is a metallic-based plate. In some embodiments, the metallic-base plate is one of a solid piece of steel and a nonskid diamond plate aluminum plate fastened to the steel frame work. In some embodiments where the training deck 10 is steel, the training deck 10 is weld fastened to the steel frame work. In embodiments where the training deck 10 is nonskid diamond plate aluminum, the training deck 10 is mechanically fastened to the steel frame work. However, the training deck 10 can be any size and can include any makeup and composition of materials that is sufficient to support an operating motorcycle and a set of automated training system components.

The training deck 10 includes several turntable mounting ring screw holes 72 for mounting a front-wheel turntable in some embodiments. In addition, the training deck 10 includes several hydraulic line cut outs 22 through which hydraulic lines 20 are run up to the hydraulic cylinders 18. The hydraulic lines 20 also run down through the hydraulic line cut outs 22 and under the training deck 10. In some embodiments, the hydraulic lines 20 run under the deck all the way to the front of the deck where the hydraulic tank 32 is positioned.

The hydraulic lines 20 run through one or more sides of the hydraulic tank 32 in some embodiments to the control system 34. In some embodiments, the control system 34 is embedded within the hydraulic tank 32. The control system 34 of some embodiments is an electronic/hydraulic control system. The control system in these embodiments comprises a fluid reserve tank to hold hydraulic fluid, and an electric pump motor shaft that drives the physically coupled hydraulic pump. The pressurized fluid flows to a hydraulic distribution block with two 2-way portioning valves. These two 2-way portioning valves are connected to the hydraulic struts 16 with high pressure hydraulic fluid lines 20.

The motorcycle 84 is positioned securely on the training deck 10 in some embodiments by the front wheel turret assembly 94, while the rear of the motorcycle is attached to the set of rear control arms 14 and the set of struts 16 in order to spin the rear wheel when power is applied. In some embodiments, the set of struts 16 comprise electronically-controlled hydraulic struts. The electronically controlled hydraulic struts secure the motorcycle 84 to the training deck 10 by physically fastening the struts 16 to the training deck 10 and to the motorcycle frame. The controlled hydraulic struts 16 assist with or retard the leaning position of the frame of the vehicle.

Although not visible in the example automated training system illustrated in FIG. 1, the set of hydraulic cylinders 18 comprises two controlled hydraulic two-way cylinders. Each cylinder is mounted to a deck hydraulic cylinder mounting bracket 38 on one side of the training deck 10 and then to the rear of the matching side of the motorcycle 84.

The front wheel turret assembly 94 is mounted to the training deck 10 in some embodiments to secure the front wheel 88 of the motorcycle 84 to the training device. As mounted, the front wheel turret assembly 94 of some embodiments provides a limiting safety factor and permits a person to turn and/or lean the front of the motorcycle. In some embodiments, the turret assembly comprises the set of adjustable wheel safety arms 24 and the front wheel chock 26. The front turret assembly consists of a height and width adjustable wheel retention safety strap that secure over the top of the front tire of the motorcycle. The wheel retention safety strap is bolt fastened to an adjustable wheel chock. The adjustable wheel chock 26 is width adjustable to accommodate different thicknesses of different wheels. The adjustable wheel chock 26, with wheel retention safety strap bolt fastened to it, is welded to the top half of a multi-directional swivel joint. The bottom half of the multi-directional swivel joint is welded to a steel shaft with machined smooth surfaces with a threaded end. The completed steel shaft assembly is inserted into a machined bearing housing that is fitted with weight distributing tapered roller bearings on top and bottom with matching grease seals. The bottom threaded part of the machined shaft, with a retention nut securing the steel shaft to the inside of the machined bearing housing, acts as a tension-providing device.

The rear roller assembly 44 of some embodiments allows the motorcycle to have the rear tire rotate at speed and simulate forward motion. Additionally, the rollers allow the rear wheel 90 to generate gyroscopic stability, while the wheel 90 is under power. In some embodiments, the rear roller assembly 44 comprises two horizontal non-resistant (NR) high speed rollers spaced equidistant from a pair of angle mounted NR high speed rollers. All of the NR high speed rollers are mounted to high speed bearings. The NR roller/high speed bearing assemblies in some embodiments are hard mounted to custom-made angle brackets. Each NR roller/high speed bearing assembly angle bracket bolts into a carriage assembly. The carriage assembly is the carrier for the NR rollers/bearing assembly. The brackets are slotted to allow for maximum adjustments inside of the carriage assembly to compensate for different tire heights and widths. The carriage itself has slotted mounts to allow for maximum adjustment. The carriage slides along a rail with machined slots to accommodate different mounting positions. There are several A to D speed sensors affixed to the rollers to assist the computers with input with regards to speed, lean angle, and control.

While the above information describes several components of the example automated training system described by reference to FIG. 1, the next example describes some of the operations of these components and elaborates on their relationships to each other.

Figure 2:
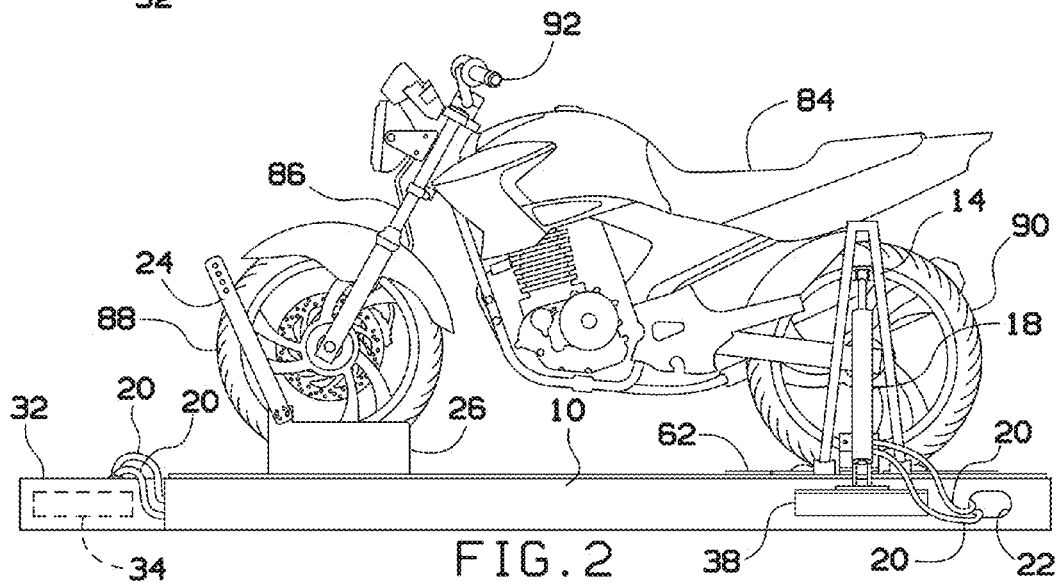
FIG. 2 shows a side view of the embodiment shown in FIG. 1.

FIG. 2 conceptually illustrates a side view of the motorcycle and the example stationary hydraulically assisted automated training system illustrated in FIG. 1. As shown in, when the motorcycle 84 is securely mounted to the training deck 10, the motorcycle rests with the front wheel 88 controlled by the front wheel turret assembly 94. The rear tire 90 rests on the roller assembly 44 at the opposite end of the deck 10 with the rear of the motorcycle 84 restrained by the pair of motorcycle frame to training deck mounted hydraulic struts 16.

In some embodiments, learning of motorcycle riding skills commences when the rider of the motorcycle begins to apply power to the motorcycle rear wheel 90 by engaging the transmission of the motorcycle 84. After engaging the transmission, the motorcycle 84 produces gyroscopic stability due to the spinning of the rear wheel 90. The pair of hydraulic struts 16 control the rear of the motorcycle and assist in keeping the spinning rear wheel on the roller assembly 44.

When the secured front wheel 88 turns or leans in the front wheel turret assembly 94 as a result of rider input, the turret assembly 94 supports and controls the front of the motorcycle 84, mimicking the response of an unrestrained motorcycle front wheel. When the rider turns or leans the motorcycle 84 from the vertical position to a desired lean angle, the handlebar 92 controls sense the direction and movement of the handlebars 92. Based on the sensed direction and movement, the hydraulic pressure system and controls properly pressurize the correct portion of each of the pair of hydraulic cylinders 18 to support and/or control a predictable sustainable lean reaction. As the rider learns to initiate the desired maneuver, the spinning rear wheel transitions from a vertical position, one that is supported by the pair of horizontal opposed rollers 46, to an angled position based on the amount of lean that is supported by the adjustable angled rollers 48. The rear wheel 90, which has the movement assisted and/or controlled by the pair of motorcycle frame to deck mounted hydraulic struts 16, transitions smoothly from a vertical or static position to a stabilized lean angle position. In this way, the rider to able to learn and understand the finesse controls of the motorcycle and the dynamics of motorcycle riding. Once the training is over, or if there is a control issue, the hydraulic struts 16 return the motorcycle 84 to an upright vertical static position.

Because the training device uses a real running motorcycle to simulate real riding sensations while secured to the training deck in a controlled and supervised environment, a person who would traditionally learn motorcycle riding skills in an uncontrolled (e.g., outdoor) environment can now learn the basics of motorcycle riding and also can focus on specific challenging motorcycle maneuvers that are safer to learn in the controlled environment provided by the automated training system described in this specification. Also, because the new or novice rider learns by giving an input to the motorcycle and immediately experiencing the directly related reaction on a real running motorcycle, the learning curve is much faster than in a traditional outdoor setting.

Furthermore, in terms of motorcycle riding instruction, there is a vast unserved market of people with prosthetic limbs who are eager to learn how to ride and operate a motorcycle. The stationary hydraulically assisted automated training system in some embodiments provides a sufficiently controlled and safe learning environment for people with any of several prosthetic devices. In the past, this market has gone largely unnoticed because teaching motorcycle riding skills to a person who had a prosthetic device had been feverishly difficult in uncontrolled (i.e., outdoor) teaching environments. Nevertheless, recent advances in prosthetic technology have provided many people with greater freedom of prosthetic movement. Thus, it is not entirely uncommon to see people with prosthetic devices involved in activities that had previously been virtually impossible to perform (e.g., lifting weights at a gym, hiking along a nature trail, jogging in the street, etc.). However, given the many challenges that been overcome due to improvements in prosthetic technology, many additional challenges remain. For instance, an improved prosthetic "knee" may be able to "bend" in a way that a human body-bound knee bends, yet the prosthetic knee may only support a certain amount of weight or force that is far less than a healthy human knee. Accordingly, precautions are still in order for most people with prosthetic limbs. By offering a controlled and supervised learning environment, however, people with prosthetic devices can begin to learn how to ride at a slower, more gentle pace that is suited to their particular physical needs. In this way, a person with a prosthetic device can learn how to ride a motorcycle before ever taking ride in an uncontrolled riding outdoor environment.

Figure 3:
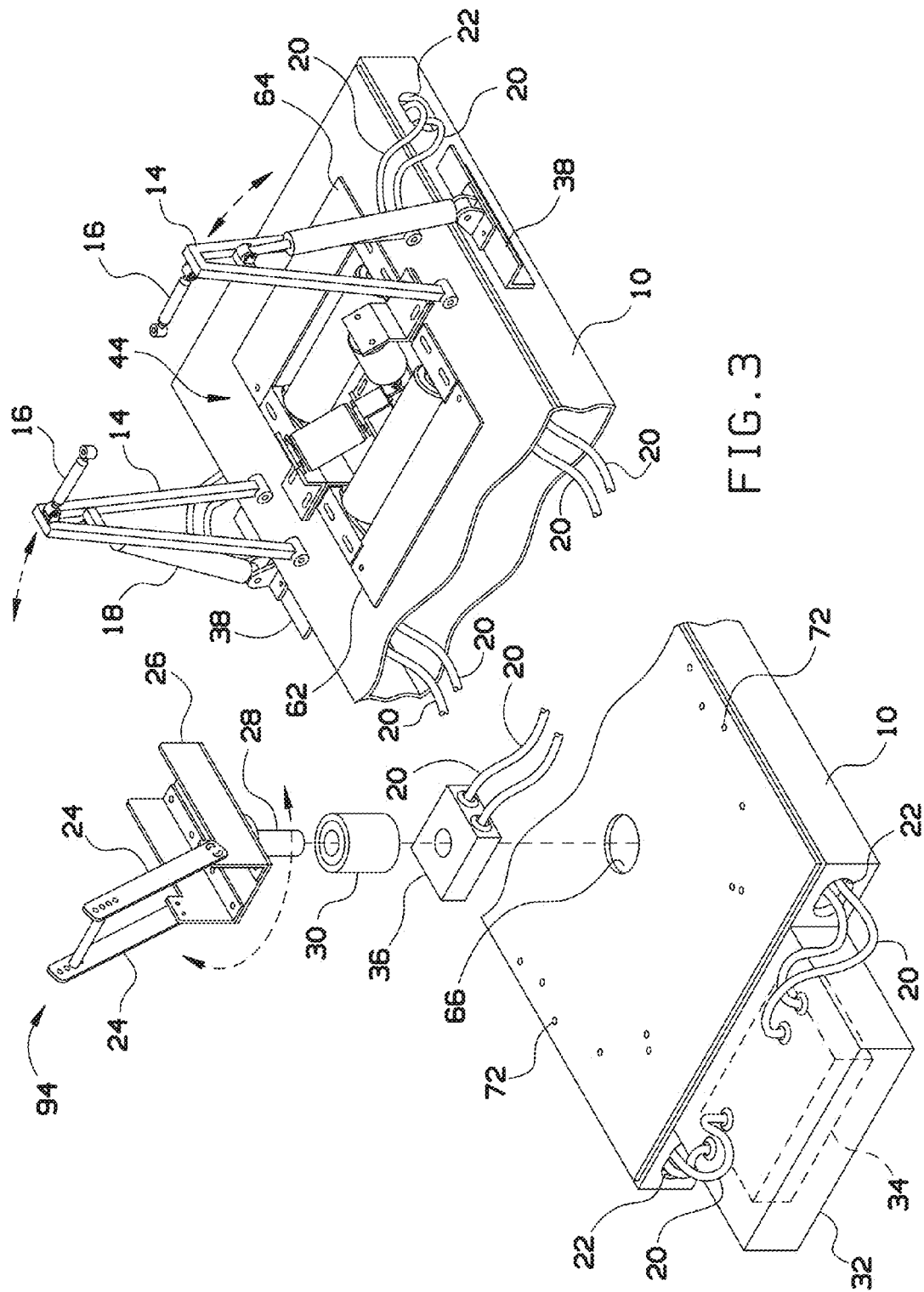
FIG. 3 shows a partially exploded perspective view of the embodiment of FIG. 1.
Figure 4:
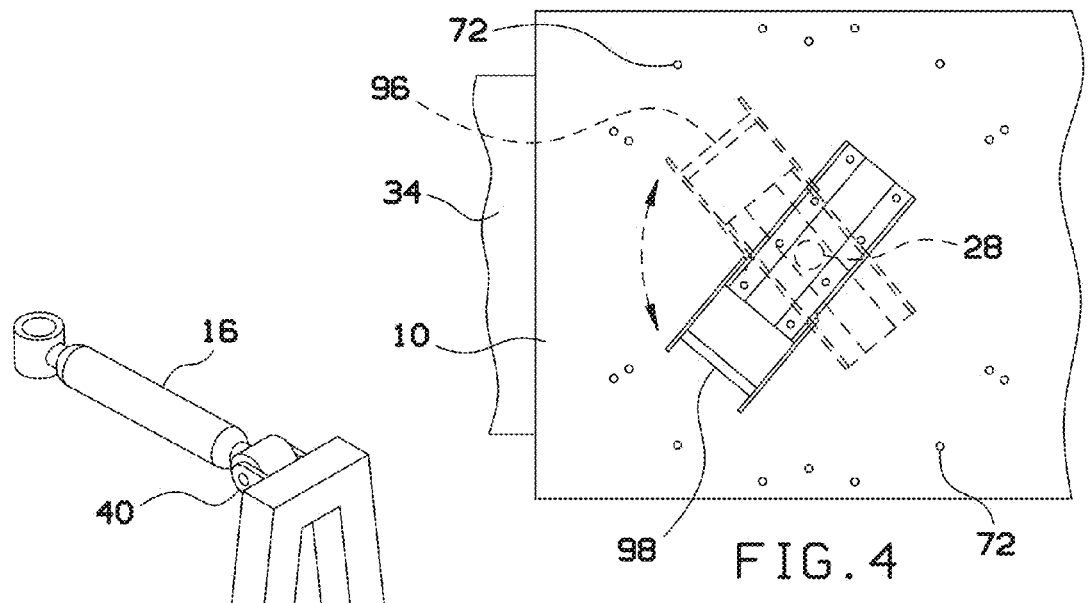
FIG. 4 shows a detailed top view of the front wheel support assembly of the embodiment of FIG. 3.

FIG. 3 conceptually illustrates a partially exploded perspective view of an example automated training system of some embodiments. In this example, several components of the example automated training system and the operations of those components are described in relation to FIGS. 4-7. The example automated training system of FIG. 3 is similar to the example automated training system illustrated in FIG. 1, except that in this figure some or all of the plurality of hydraulic lines 20 run under the training deck 10. In addition, the front wheel turret assembly is illustrated in a partially exploded perspective to reveal a plurality of additional components not described by reference to the front turret assembly of FIG. 1. Dashed lines proximate to the front wheel turret assembly and each of the rear control arms conceptually illustrate functional operations of the stationary hydraulically assisted automated training system that occur while a student performs various motorcycle maneuvers.

As shown, the front wheel turret assembly 94 of some embodiments comprises the set of adjustable wheel safety arms 24 and the front wheel chock 26. The adjustable wheel safety arms of some embodiments are bolt fastened to the front wheel chock 26. In some embodiments, instead of a set of adjustable wheel safety arms 24, the front wheel turret assembly 94 comprises a height and width adjustable wheel retention safety strap (not shown) that secures over the top of the front wheel 88 of the motorcycle 84.

In some embodiments, the width of the wheel chock 26 is adjustable to accommodate different thicknesses of different motorcycle front wheels. In some embodiments, the adjustable wheel chock 26 (with the adjustable wheel safety arms bolt fastened to it) is welded to the top half of a multi-directional swivel joint and the bottom half of the multi-directional swivel joint is welded to a steel shaft with machine smoothed surfaces and a threaded end. In some embodiments, a complete steel pivot shaft/pin 28 assembly comprises the multi-directional swivel joint and the steel shaft when welded together. The steel pivot shaft/pin 28 assembly of some embodiments inserts into a bearing assembly 30. The bearing assembly 30 of some embodiments comprises a machined bearing housing that is fitted with weight distributing tapered roller bearings on the top and bottom with matching grease seals. In addition, a retention nut is used to secure the steel shaft to the inside of the machined bearing housing in some embodiments. The bottom threaded portion of the steel shaft also acts as a tension-providing device. In some embodiments, the bearing assembly 30 fits into a bearing assembly access hole 66 on the surface of the training deck 10. When the bearing assembly 30 is fully fit into the access hole 66 of the deck 10, the front wheel turret assembly 94 rests on the training deck 10 with the wheel chock 26 flush to the surface of the deck 10.

In some embodiments, the bearing assembly attaches to the top of a hydraulic directional valve 36 comprising a hole through which the steel shaft fits. The directional valve 36 in these embodiments is positioned under the surface of the training deck 10 and is therefore not visible when the automated training system is fully assembled. In some embodiments, the hydraulic directional valve 36 provides hydraulic control of directional maneuvers. For instance, the hydraulic directional valve can increase or decrease pressure in response to a person on the motorcycle turning the handlebars to steer to the right or steer to the left.

While the components of the front wheel turret assembly 94 of the example automated training system shown in FIG. 3 have been described, the following example pertains to the operation and function of the front wheel turret assembly 94 when a person is operating the motorcycle and engaging the handlebars to perform steering maneuvers. This example is described by reference to FIG. 4, which conceptually illustrates a detailed top view of the front wheel turret assembly 94 with exemplary rotations of the motorcycle handlebars 92. Specifically, the turret assembly 94 is rotated to the right 96 and to the left 98 (as illustrated by the dashed arrow), while the front wheel is maintained at a pivot point associated with the steel pivot shaft/pin 28.

In this case, the steel pivot shaft/pin 28 assembly performs an essential holding function so that the rotation of the front wheel turret assembly 94 based on a person's movement of the handlebars 92 of the motorcycle 84 does not change the pivot point of the front wheel 88. In some embodiments, the steel pivot shaft/pin 28 assembly holds the front wheel turret assembly 94 at the same position in coordinate space while providing full rotation operations along a single axis. In particular, the machined bearing housing 30, which holds the steel shaft of the steel pivot shaft/pin 28 assembly with the set of adjustable wheel safety arms 24, the wheel chock 26, and the multi-directional swivel joint, prevents the motorcycle from escaping the trainer as the machined bearing housing is welded to the underside surface of the training deck 10. The bottom retention nut, which secures the steel shaft to the inside of the machined bearing housing 30, acts as tension-providing device. The steel table turret acts to slow down the inertial reactions of a heavier motorcycle and provides a mounting surface for the front stabilizing safety arms 24.

Thus, when the person steers to the right (i.e., moves the handlebars to the right), the front wheel turret assembly 94 is rotated to the right 96 but not moved from its coordinate space position. Likewise, when the person steers to the left (i.e., moves the handlebars to the left), the front wheel turret assembly 94 is rotated to the left 98 but not moved from the position in coordinate space. Because the wheel turret assembly 94 can be rotated to the right and left to simulate motorcycle steering without moving the front wheel turret assembly 94 its coordinate space position (i.e., at the pivot point of the steel pivot shaft/pin 28), the operation of steering the front wheel is controlled and safe for a person learning to ride a motorcycle.

Furthermore, in some embodiments, pressure is applied to rotations of the front wheel turret assembly to simulate steering the motorcycle. For example, the ease of steering a motorcycle by turning the handlebars depends on current velocity of the motorcycle, the weight of the motorcycle, the tire size of the front wheel, the amount of air in the tire, etc. Thus, in these embodiments, a controlling device calculates and applies a certain amount of pressure to steer the motorcycle. In particular, the hydraulic directional valve 36 of some embodiments provides hydraulic control of handlebar-based directional maneuvers. For instance, the hydraulic directional valve can increase or decrease pressure in response to a person on the motorcycle turning the handlebars to steer to the right or steer to the left. In some embodiments, the amount of pressure provided by the hydraulic directional valve 36 varies based on one or more control parameters. The control parameters determine a steering feedback pressure setting for controlling the steering motions of the handlebars in some embodiments. The control parameters include the simulated speed at which the motorcycle is operating, the weight of the motorcycle, the weight distribution between the front wheel 88 and the back wheel 90, and/or several other factors that can affect the handlebar operation that a person would experience while riding a motorcycle. In this way, the student is provided life-like sensory feedback from the motorcycle for the simulated front wheel steering experience.

The rotation of the front wheel turret assembly 94 in some embodiments provides only a limited simulated motorcycle riding experience. In some embodiments of the automated training system, the rear control arms 14 provide another set of movements for simulating a motorcycle riding experience. The following example describes the operation and function of the rear control arms 14 and other associated components.

Figure 5:
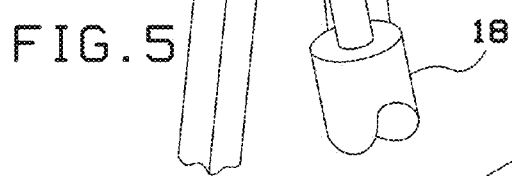
FIG. 5 shows a detailed perspective view of a lateral control system of the embodiment of FIG. 3.

FIG. 5 conceptually illustrates a detailed perspective view of a rear control arm 14 of the automated training system illustrated in FIG. 3. The rear control arm 14 shown in this figure is typical of what may be one of a plurality of such control arms positioned on the base 10 at different points around the frame of the vehicle, such as shown by example in FIG. 8. It should be understood, however, that although the embodiment of control arm 14 in FIGS. 3 and 5 are hydraulically actuated, as described below, other means of actuation are contemplated, as explained in association with the embodiment of FIG. 9. In either case, the control arm (in this case of FIGS. 3 and 5—the "rear" control arm) is hydraulically controlled to allow a person on the motorcycle to lean into a turn. When the person leans into the turn, the hydraulic control system 34 calculates an angle associated with the lean, and controls the hydraulic studs 16 and hydraulic cylinders 18 so that the rear control arm 14 can be positioned according to the angle.

In some embodiments, the calculated angle is applied with respect to one side of the motorcycle. The hydraulics on other side of the motorcycle simulate the leaning based on a negative angle. For example, if a student steers right, the hydraulic control system 34 will calculate an angle (e.g., 5 degrees) for setting the hydraulics on the right side of the motorcycle according to the angle set for leaning the motorcycle, and will then calculate the corresponding negative angle (e.g., −5 degrees, or 355 degrees) for setting the hydraulics on the left side of the motorcycle.

Figure 6:
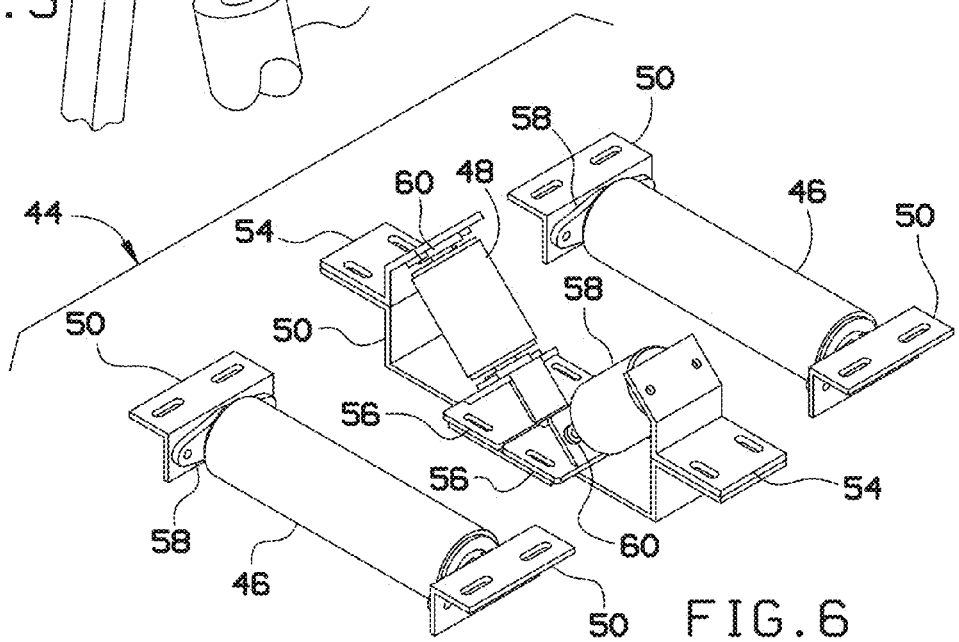
FIG. 6 shows a detailed perspective view of a rear wheel support assembly of the embodiment of FIG. 3.

FIG. 6 conceptually illustrates a detailed perspective view of the rear roller assembly 44 of the example automated training system illustrated in FIG. 3. In some embodiments, the rear roller assembly 44 allows the motorcycle to have the rear wheel 90 rotate at various speeds and simulate forward motion. Also, the rollers allow the rear wheel to generate gyroscopic stability, such that the rear wheel gets powered to sufficiently sustain an upright position.

As shown, the rear roller assembly 44 in some embodiments includes a set of horizontal rollers 46, a set of angled rollers 48, horizontal roller brackets 50 for holding the horizontal rollers, angled roller main brackets 52 for holding the angled brackets, a set of angled roller upper angled brackets 54 for holding the angled brackets, a set of angled roller lower angled brackets 56, a set of horizontal roller bearings 58, a set of angled roller bearings 60, a front removable deck plate 62, and a rear removable deck plate 64.

In some embodiments, the front and rear removable deck plates 62 and 64 are part of an adjustable roller bearing carriage (ARBC). In these embodiments, the training deck 10 has an opening for the ARBC. Positioned within the ARBC are the horizontal and angled rollers (referred to collectively as "rollers"). The rollers of some embodiments are individual machined metal, spun-balanced rollers that are mounted to high speed pillow bearings. The horizontal rollers with bearings are fastened to the horizontal roller brackets 50 in the inside of the ARBC. In some embodiments, the horizontal roller brackets 50 are steel brackets. In some embodiments, each individual roller and bearing with corresponding brackets are mounted to a slotted track in the ARBC. The slotted track allows adjustment of the internal linear distance between the rollers. The two angled rollers are centered within the ARBC equidistant between the horizontally opposed rollers and mounted in an angled "V" configuration with one roller per angle. In some embodiments, each angled "V" roller and the corresponding bearings and brackets are mounted to a slotted track in the ARBC to adjust the distance between the angled "V" rollers. The distance between the angled "V" rollers is adjustable by sliding the brackets in or out on the ARBC. The ARBC mounts directly to the training deck in some embodiments.

Figure 7:
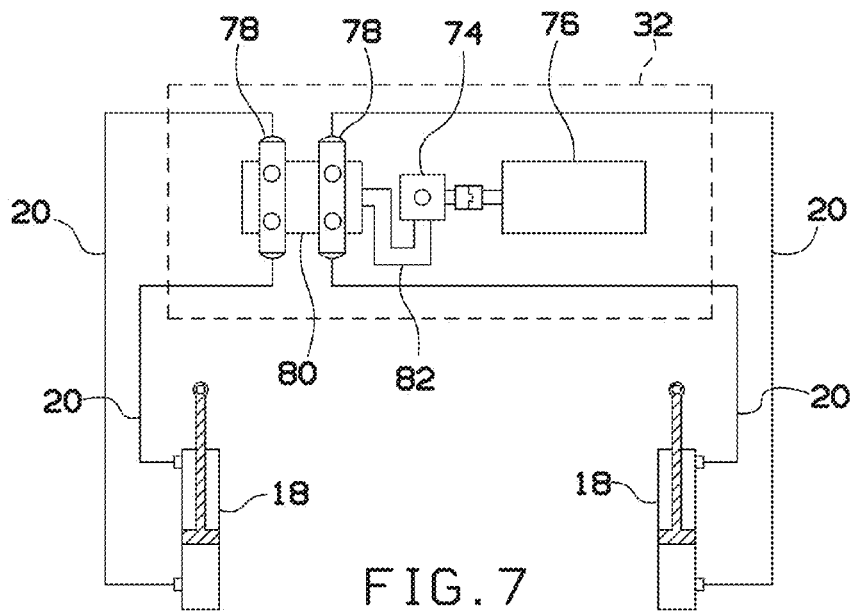
FIG. 7 shows a schematic view of a hydraulic circulation system applicable to at least some embodiments of the invention herein.

FIG. 7 conceptually illustrates a schematic view of a hydraulic control system 34 in some embodiments. As shown, the hydraulic control 34 includes a set of two way valves 78, a hydraulic pump 74, a hydraulic pump motor 76, a hydraulic manifold 80, and a hydraulic manifold main line 82. In some embodiments, the hydraulic control system 34 is a pressure-based system with a set of electronically operated controls. The electronically controlled hydraulic system has a fluid reserve tank 32 (shown with dashed lines in FIG. 7) to hold hydraulic fluid. The hydraulic pump motor 76 in some embodiments is an electric pump motor with a shaft that drives the physically coupled hydraulic pump 74. The pressurized fluid flows over to a hydraulic distribution block with the set of two-way portioning valves 78. The two-way valves 78 are connected to the hydraulic struts 18 by the high pressure hydraulic fluid lines 20.

Figure 8:
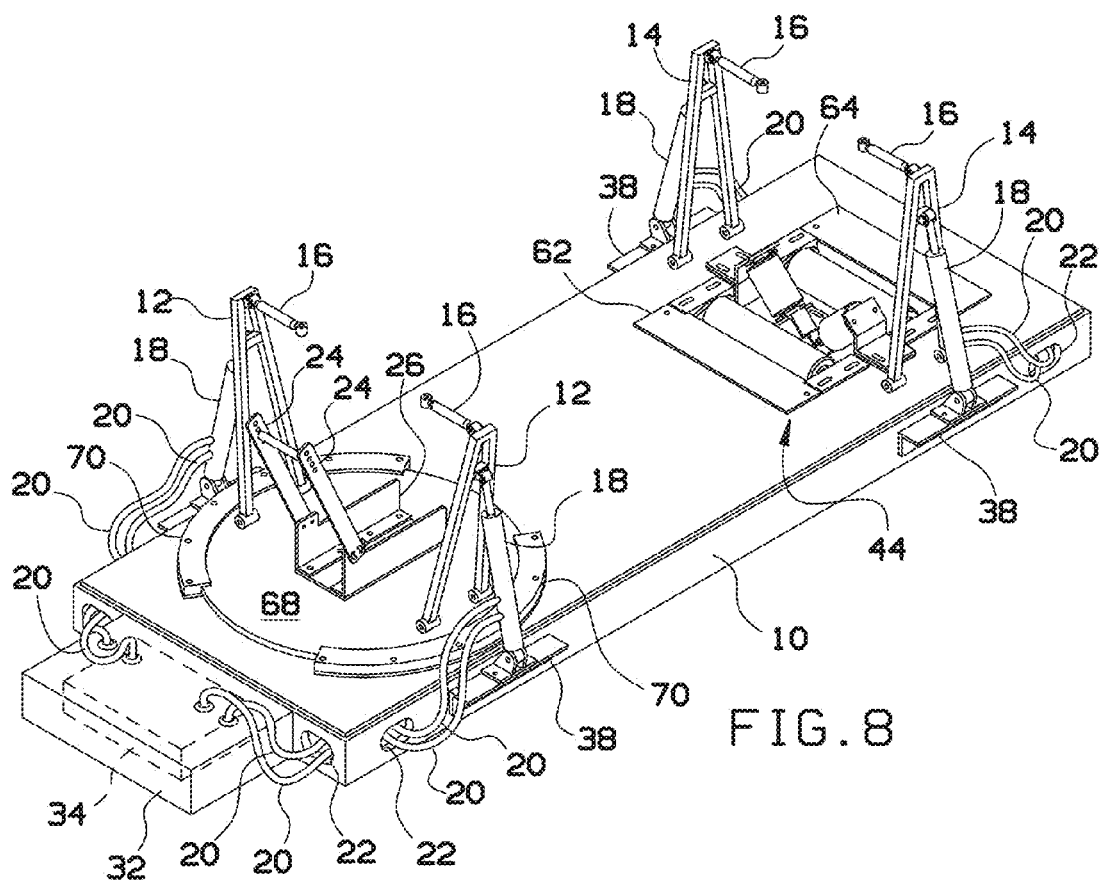
FIG. 8 shows a perspective view of an alternative embodiment of the invention herein.

In some embodiments, if the motorcycle 84 is physically large, the front wheel turret assembly 94 will be fitted with a round table top or turn table. FIG. 8 conceptually illustrates a perspective view of an example stationary hydraulically assisted automated training system having front and rear control arms and a turn table 68 for simulating the riding experience of a physically large motorcycle in some embodiments. Like the stationary hydraulically assisted automated training system illustrated in FIG. 5, the automated training system shown in this figure includes a set of rear control arms 14. In addition to the rear control arms, the automated training system shown in this figure includes a set of front control arms 12, whose features and operations are similar to the features and operations of the rear control arm described by reference to FIG. 5.

Additionally, a turn table 68 is shown in FIG. 8 as being installed beneath the front control arms 12. The turn table 68 of some embodiments provides a mounting surface for the front control arms 12 and secures the front control arms to the training deck 10. In addition, the turn table 68 of some embodiments provides additional support of the motorcycle and added stability for the rear of the motorcycle.

In some embodiments, the turn table 68 turns within mounting rings 70. The turn table 68 of some embodiments can move within a defined circular range. In some embodiments, the defined circular range is configurable. For example, the circular range can be limited by the instructor to a small range (e.g., 45 degrees in either direction) for novice riders, a medium range (e.g., 60 degrees in either direction) for skilled learner riders, and a wide range (e.g., 90 degrees in either direction) for advanced riders. In these embodiments, the mounting rings include a set of pushable clips that limit the range of circular movement of the turn table 68. When pushed down, the pushable clips catch a protrusion (not shown) off of the turn table 68 at the defined angle limit.

In some embodiments, to support extremely heavy or large sized two-wheeled vehicles, the turn table 68 is welded to the steel shaft of the front wheel turret assembly 94. The multi-directional swivel joint is then welded to the exact center of the flat turn table surface. There are retention fixtures secured to the turn table 68 around the outer edge of the turn table. Also, custom fabricated frame adjustable weight distributing struts 16 can be secured at the base to the turn table 68. The top of the frame has the coupling mount from the frame to the motorcycle 84. The adjustable frame allows the coupling mount to be attached at a point that is the most advantageous to assist in the control of the front of the motorcycle 84.

Figure 9:
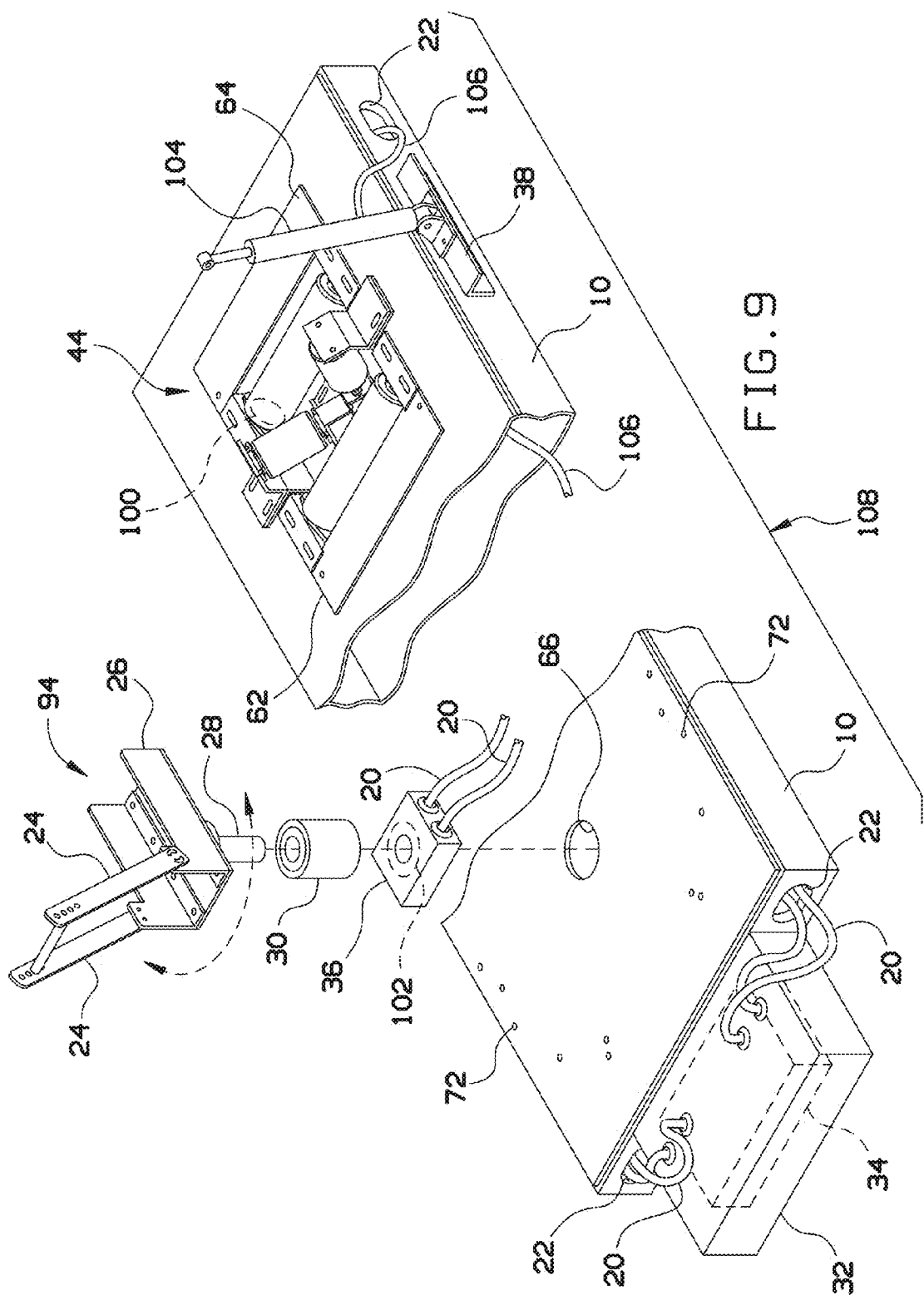
FIG. 9 shows a perspective view of yet another embodiment of the present invention.

As described above, the embodiments of FIGS. 1 through 8 comprises on example of a controller automated simulation system in which actuation of the vehicle based upon sensors sending feedback to a controller is via hydraulics. In some embodiments, the sensors transmit data that is necessary to custom design a rider's simulation software training package. For example, a set of positional control readings may be made by one or more sensors, transmitted to the control system, which subsequently responds by controlling one or more features of the motorcycle. In some embodiments, the sensor data is saved for subsequent review. For instance, the instructor may review the data after each training session, or a mechanic may read the data to determine whether there is a problem with one or more of the devices of the motorcycle. Referring to FIG. 9, another example of actuation comprises an electronic motor and cylinder. In particular, the electronic linear actuator configuration 108 in this figure includes a rear roller speed sensor 100 (not shown, but illustrated by a dashed line), a wheel turret turn sensor 102, a sensor equipped electronic linear actuator 104, and a linear actuator control cable 106.

Figure 10:
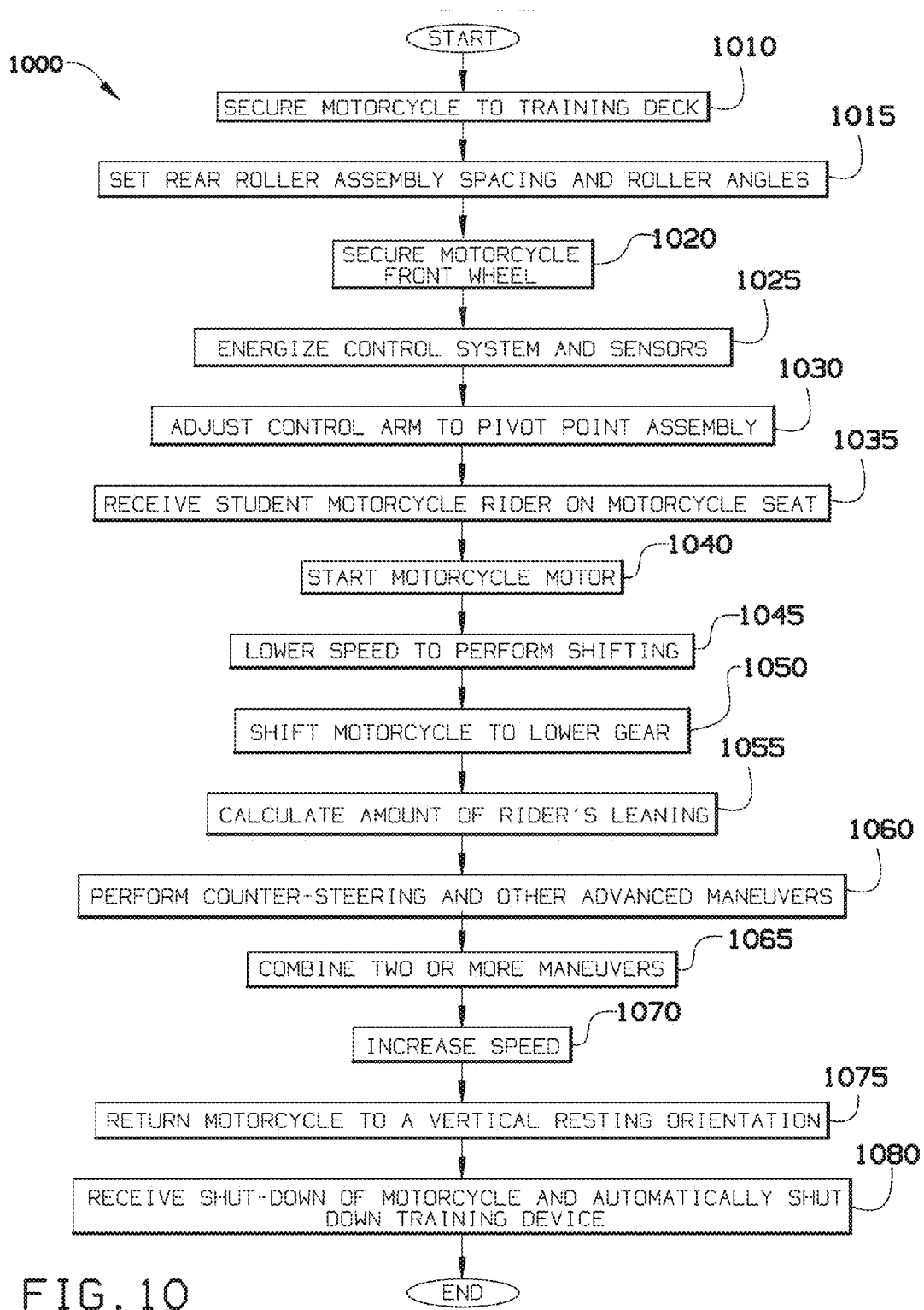
FIG. 10 shows a flow chart of one methodology of use of at least some embodiments of the present invention.

While several different embodiments of several example automated training systems have been described above, the motor cycle training device can be used in a process for teaching motorcycle riding skills. FIG. 10 conceptually illustrates one example of a process 1000 for teaching motorcycle riding skills to a student on a stationary hydraulically assisted automated training system in some embodiments. In particular, the process 1000 for teaching motorcycle riding skills can be applied to any student of any skill level. The process 1000 starts in some embodiments when a motorcycle is secured (at 1010) to the training deck of the automated training system. In some embodiments, the motorcycle is secured to the training deck by adjusting the front wheel shoe to the width of the front wheel. Next in the process, the distance between the two horizontal rollers is adjusted (at 1015). In some embodiments, to make sure that the rear wheel does not escape the roller system, the angle and distance is adjusted for the angled side rollers. Next, the front wheel restraining loop of the front wheel is secured (at 1020) in some embodiments. After the front wheel of the motorcycle is properly secured, in some embodiments, the pump is powered (at 1025) for driving the hydraulic system and pressurizing the system to an operating pressure. The hydraulic struts are next adjusted (at 1030) by this process in order to make the motorcycle stand in a vertical orientation or neutral position. In some embodiments, the motorcycle stands without the use of a motorcycle stand when the hydraulic struts are properly adjusted.

After the motorcycle is standing in a proper vertical orientation, a person can sit on the motorcycle and start a riding session. Thus, the automated training system is mounted (at 1035) when the rider sits on the motorcycle seat. In some embodiments, the seated rider takes instruction on a safe starting procedure for the motorcycle. This teaches the rider the proper way to mount and start the motorcycle. Next, the motorcycle is started (at 1040) by the rider and the instructor can present a set of instructions for shifting the motorcycle. In some embodiments, the rider can then practice shifting the motorcycle to get accustomed to the entire gear range of the motorcycle. This teaches the rider to learn to use the clutch and gear box effectively. Next, the speed is lowered (at 1045) when the rider squeezes the front brake lever and depresses the rear brake pedal to slow the rear wheel speed. This teaches the rider braking control. The motorcycle is shifted (at 1050) in some embodiments to a low gear. In some embodiments, when shifted to a low gear with the clutch out, the rider can practice turning the handle bars slightly from the left to the right. The rider then increases the range of handlebar motion without increasing the rear wheel speed of the motorcycle. This teaches the rider to maintain balance at a slow speed, which is difficult to master while moving a motorcycle that is free of the automated training system.

In some embodiments, as the rider increases skill and confidence, the rider can then lean (at 1055) the motorcycle to the left and right without a handlebar-directed turn and without an increase in rear wheel speed. By leaning to the left and right, the rider is taught upper and lower body control necessary for motorcycle control. As rider continues to increase skill and confidence, other techniques are performed (at 1060) including Counter-steering techniques at low speeds. As rider skill and confidence have increased, in some embodiments, techniques can be combined (at 1065) so the rider can begin to apply a Counter-steering technique simultaneously with a sustained lean of the motorcycle. In some embodiments, the rider finalizes the combined counter-steering and sustained lean maneuver by starting to slightly increase rear wheel speed. The rider learns that to increase the effect of the Counter-steering technique, the rider must increase the amount of directional pressing on the motorcycle handlebars. This will teach the rider the relationship between slow counter-steering and more rapid counter-steering. In some embodiments, as the rider increases the amount of motorcycle lean, the rider needs to increase (at 1070) the rear wheel speed because the higher rear wheel speed supports the increased sustained lean angle of the motorcycle by creating gyroscopic stability. This teaches the rider throttle control through a counter-steering technique on a motorcycle without leaving the automated training system.

Once the rider has practiced the above-mentioned riding techniques, the process 1000 allows the hydraulics to return (at 1075) the motorcycle to a vertical or neutral position on the automated training system. In some embodiments, the rider then shuts down (at 1080) the motorcycle and dismounts safely. In some embodiments, when the power to the motorcycle is shut down, the hydraulic system is automatically shut down. In some cases, the amount of practice of the student rider determines how quickly the student masters one or more of the motorcycle riding skills. In any event, by using the automated training system, all student riders are provided a controlled and safe environment for learning motorcycle riding skills.

Some embodiments of the automated training system support a weather mode. When the automated training system is configured in operate in the weather mode, any of several weather conditions can be included for the control system 34 to simulate the weathered condition. For instance, a wet, rainy weather mode may be set to simulate riding the motorcycle on a somewhat sliding paved road, while a snow mode can be set to simulate a very slick paved road. Fans, wind blowers, dust blowers, wet tracks, etc. can be deployed in an automated training system setup to provide one or more of the simulated weather modes. The control system 34 can be programmed to respond differently based on the selected weather mode. In some embodiments, the control system includes a preset number of weather mode programs. In other embodiments, different weather mode programs can be obtained and installed to update the control system 34 to provide the weather mode. In other embodiments, a terrain mode is included in which different terrain features are simulated for the learning rider. For example, the automated training system can be set to teach off-road riding skills for a student with a dirt bike and can be set to teach street riding skills for a person with a street-legal motorcycle.

In some embodiments, the automated training system comprises an electronic actuator configured to actuate a piston within a cylinder. When the automated training system supports a motorcycle in a stationary upright position, the electronic actuator causes the motorcycle to simulate a motorcycle riding experience for a person seated on the motorcycle. For instance, a student learning to ride may be seated on the motorcycle and performing a variety of motorcycle maneuvers which the automated training system simulates via the electronic actuator.

Figure 11:
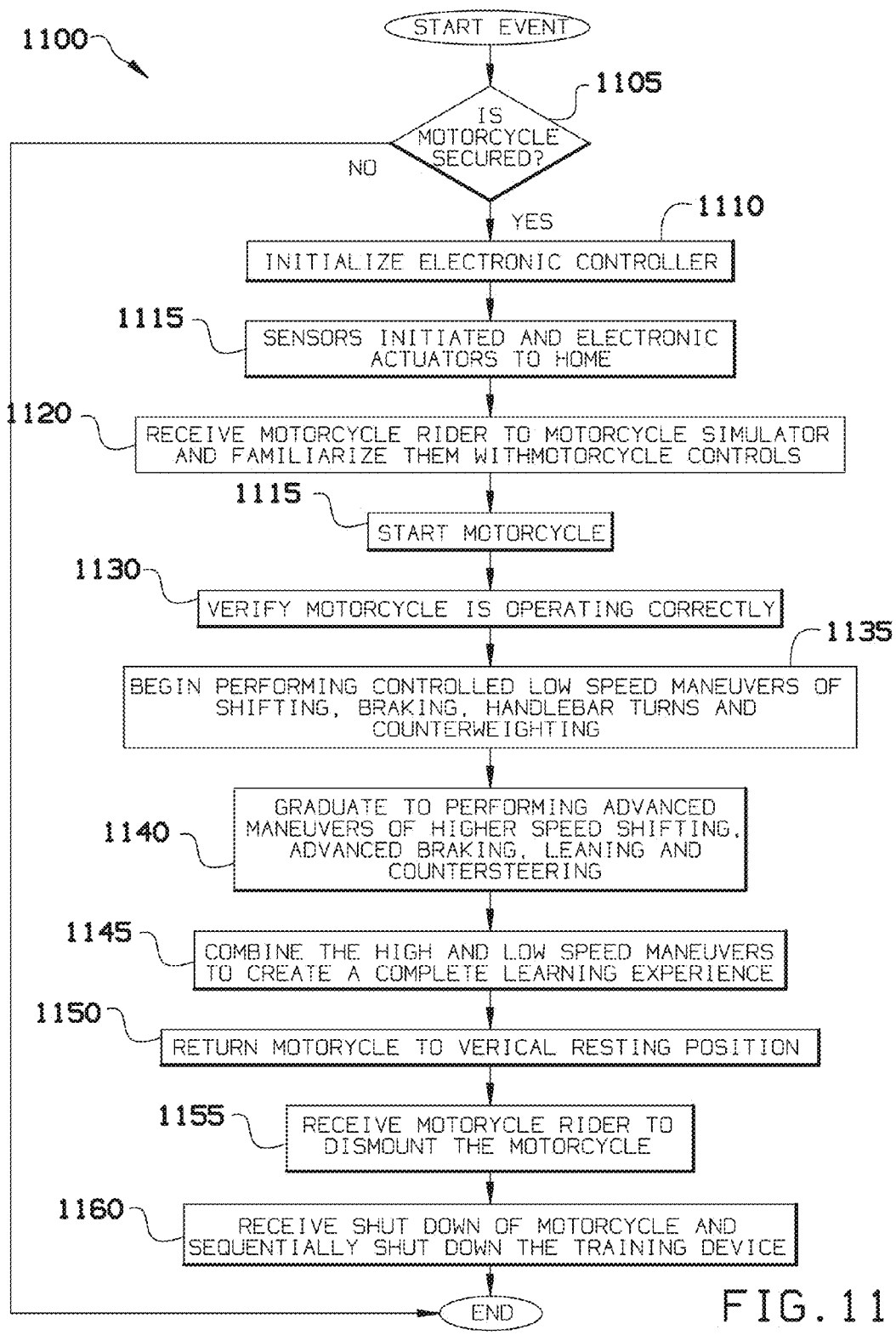
FIG. 11 shows a flow chart of an alternative methodology of use of at least some embodiments of the present invention.

FIG. 11 conceptually illustrates another example of a process 1100 for operating an automated training system having an electronic actuator in some embodiments that allows a student to learn how to ride a two-wheeled automotive vehicle. The process 1100 is performed by the automated training system when a fully functional two-wheeled vehicle stationed on the training system is operated by a person. In some embodiments, the process 1100 starts when the person sits in an operator's seat of the two-wheeled vehicle. In some embodiments, the person is a student learning to ride a motorcycle and the process 1100 begins when the student is seated upon the motorcycle. In some other embodiments, the process 1100 begins when the student or an instructor activates the automated training system. For instance, an instructor turns on a power source of the automated training system after a motorcycle is stationed in an upright starting position.

Upon starting, the process 1100 of some embodiments verifies (at 1105) that the motorcycle is secured to the automated training system. In some embodiments, the process 1100 ends if the motorcycle is not secured. For instance, the motorcycle's front wheel may not fit in the front wheel boot or the rear roller assembly is not in alignment with the rear wheel and, therefore, the rear wheel does not rest on both rollers. In some embodiments, the automated training system is shut down if the vehicle is not properly secured. This allows the student or instructor to re-secure the motorcycle and, once re-secured, power up the system. In some embodiments, the automated training system indicates that the motorcycle is not secured. The system can indicate this is any of several manners, including, displaying a message on an LCD screen of a control panel of the automated training system, or by flashing a set of lights in a manner that suggests a problem (e.g., like hazard lights of an automotive vehicle).

When the process 1100 verifies that the motorcycle is secured properly, the process 1100 then initializes (at 1110) an electronic controller of the automated training system. The electronic controller of some embodiments is a logical processing component of the training system, tying together a set of sensors and actuators of the system which effectuate a simulated riding experience on a real motorcycle. The logical processing component in some embodiments is a microprocessor. The set of sensors comprises at least a rear sensor and a front sensor. The rear sensor relays the rear wheel speed and the front sensor relays the handle bar movement to the microprocessor. The microprocessor interprets the inputs received from the two sensors and sends a control signal to an actuator at the rear of the motorcycle. The actuator then adjusts the lean of the motorcycle. The actuator controls the lean of the motorcycle to account for, but not limit, turning, leaning, counter-steering, counter-weighting, speed, shifting, and braking. The electronic controller is described further below.

The process next initializes (at 1115) the sensors and actuators. The sensors and actuators are components of the automated training system of some embodiments. The sensors provide sensory input to the electronic controller in some embodiments. The actuators receive commands from the controller in some embodiments for moving the motorcycle in a manner responsive to student motorcycle maneuvers, only constrained by physical limitations. In some embodiments, the sensors and actuators are set to home (or default) positions and settings when initialized. The sensors and actuators of the automated training system are described further below.

Next, the process 1100 receives (at 1120) a student rider who sits on the motorcycle. In some embodiments, the student rider is demonstrated a set of motorcycle controls. When the student is ready and starts the motorcycle ignition, the process 1100 starts (at 1125) the motorcycle. In some embodiments, the student uses a key of the motorcycle to directly start the motorcycle. In some other embodiments, the automated training system includes a "startup" ignition which when activated by the student or an instructor, causes the automated training system to start the motorcycle ignition. As mentioned above, the motorcycle supported on the automated training system is a fully-functional motorcycle. In some embodiments, the process verifies (at 1130) that the motorcycle is operating correctly. This verification is an automatic safety check to ensure that the motorcycle can operate upon the automated training system.

If the motorcycle passes the safety check, the process 1100 begins performing (at 1135) controlled low speed maneuvers of shifting, braking, handlebar turns, and counterweighting. Next, the process graduates to performing (at 1140) advanced maneuvers of higher speed shifting, advanced braking, leaning, and counter-steering. A complete learning experience is offered to the student next when the process combines (at 1145) the high and low speed maneuvers for a full range of actual maneuvers that a motorcycle rider would likely perform on a real road or course.

After the student has performed these maneuvers, and is finished with the riding lesson, the process 1100 returns (at 1150) the motorcycle to its default vertical resting position. Then the student is able to depart, so the process receives (at 1155) the dismount of the motorcycle student rider. Finally, the process receives (at 1160) a shutdown of the motorcycle and sequentially performs shut down operations of all facets of the automated training system. The process 1100 provides an overview of the way a student can use the automated training system, as equipped with an electronic actuator, to learn motorcycle riding skills in a safe, controlled, and supervised environment. While several general maneuvers are described in process 1100, more detailed, specific operations are further described below.

Figure 12:
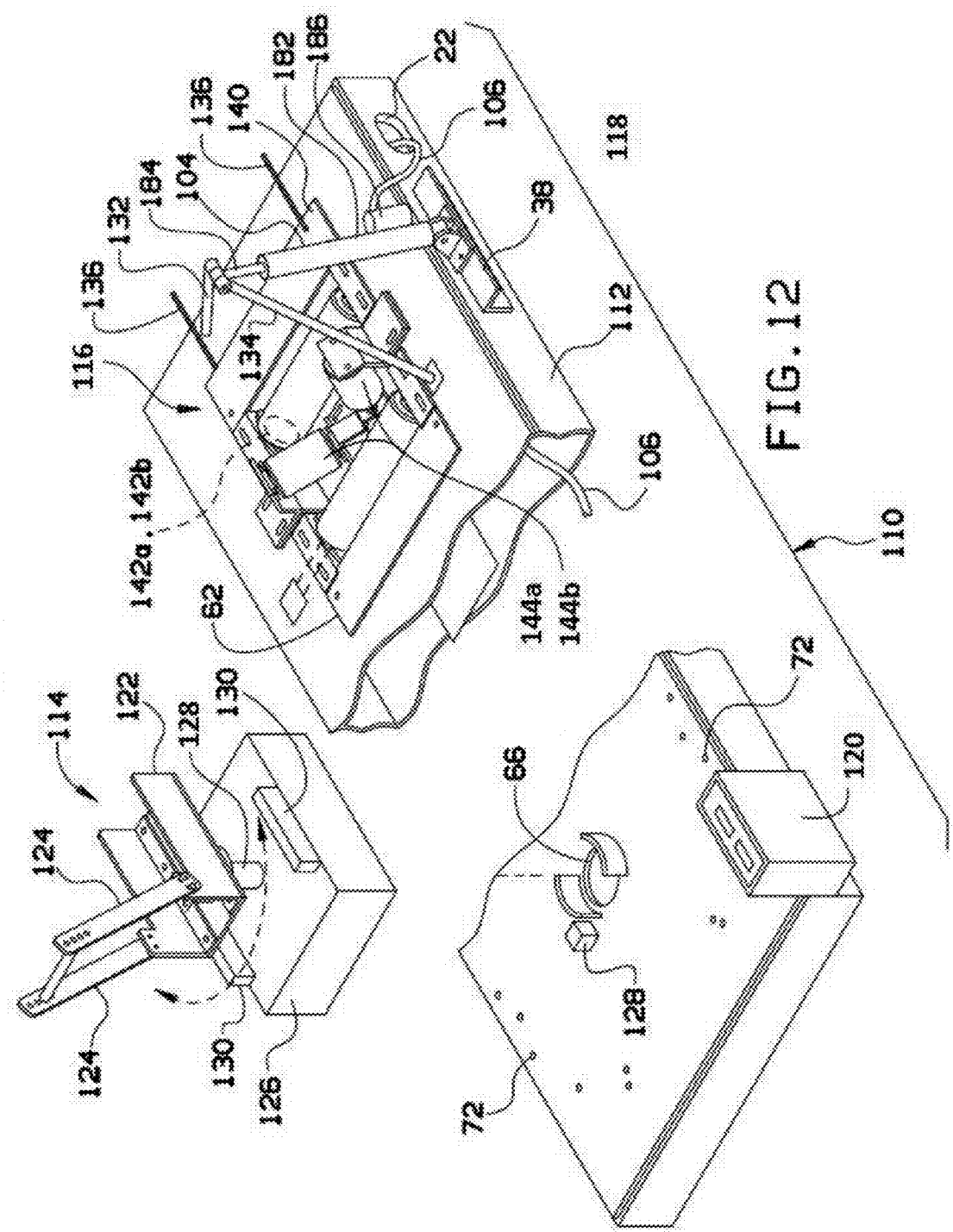
FIG. 12 shows a perspective view of yet another embodiment of the present invention.

FIG. 12 conceptually illustrates a perspective view of an example automated training system with an electronic actuator in some embodiments. The automated training system shown in this figure is similar to the hydraulically-actuated automated training system illustrated in FIG. 3, except that the training system illustrated in FIG. 12 comprises electronic actuation rather than hydraulic actuation. Although any single track two-wheeled vehicle could be used on the automated training system shown in this figure, many of the features and components of the example training system shown in this figure are described by reference to a motorcycle. As a person having skill in the art would appreciate, the functional aspects and features of these components would apply in similar manner to other single track two-wheeled vehicles.

Figure 17:
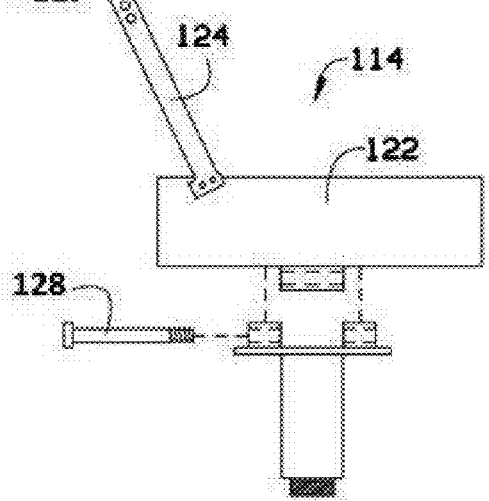
FIG. 17 shows an example embodiment of a front wheel support assembly for use with at least some embodiments of the present invention.

As shown in FIG. 12, the automated training system includes a base 112, a front wheel support system 114, a rear wheel support system 116, a vehicle frame position control system 118, and a control system 120 configured to process information gathered from one or more of the sensors and configured to be programmed to simulate realistic operation of the vehicle as if it were being operated on a road or dirt pathway. The base 112 in some embodiments of the automated training system is configured to support a two-wheeled automotive vehicle in a manner that permits operation of the vehicle but precludes forward movement of the vehicle during operation In some embodiments, the front wheel support system 114 comprises a front wheel boot 122, a front wheel stop bracket 124, and a servo motor 126. The front wheel boot 122 and stop bracket 124 are configured to cradle and secure the front wheel of the two-wheeled automotive vehicle in a manner that supports the front wheel while permitting the user to turn the front wheel radially during operation. Referring to FIG. 17, which conceptually illustrates an example front wheel assembly, the front wheel boot 122 and the stop bracket 124 can be fit for any size front tire. In some embodiments, the full cradle (boot and bracket) may be locked to the shaft by a pivot shaft/pin 128.

Figure 16:
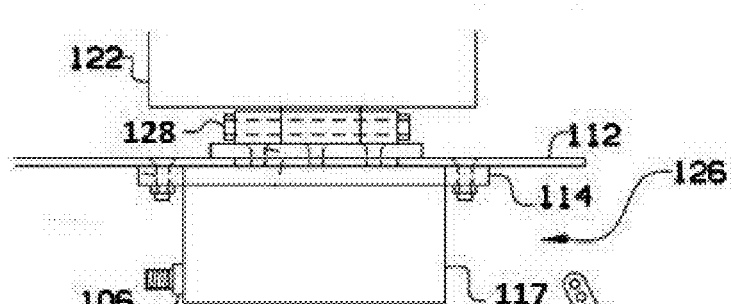
FIG. 16 shows an example embodiment of servo motor for use with at least some embodiments of the present invention.

In some embodiments, the servo motor 126 is configured to actuate the radial position of the front wheel within the front wheel support system and, in some case, can comprise means for applying resistance against radial movement of the front wheel during certain modes of operation. Such resistance may be in the form of a mechanism for braking against further radial movement, or it may comprise the motor being configured to preclude further turning of the handlebars in one direction or the other. Referring to FIG. 16, which conceptually illustrates one example of servo motor, the servo motor 126 may be positioned within the base 112 and in attachment with the front wheel assembly 114, which may be positioned at least in part above the base. The pivot shaft/pin 128 locks the connection between the front wheel assembly 114 and the servo motor 126, and a linear actuator control cable 106 connects the servo motor to the front wheel assembly to send and receive control signals. The servo motor 126 of some embodiments comprises a servo motor body 117, a linear actuator control cable 106 connects the servo motor to the front wheel assembly to send and receive control signals, a mounting plate, and a mounting bolt that attaches the servo motor body 117 to the base 112. Referring back to FIG. 12, in some embodiments, the servo motor 126 is configured as an intelligent servo motor comprising a sensor for detecting the radial position of the front wheel relative to the frame of the vehicle. In other embodiments, the servo motor is only configured to actuate the radial position of the front wheel while a discrete radial position sensor 130 is affixed to the training system base 112 to provide handlebar location information (i.e., radial offset angle) to the electronic controller.

The rear wheel support system 116 secures the rear of the two-wheeled vehicle and allows the rear wheel to rotate as power is applied by the rider to the vehicle. The rear wheel support system 116 of some embodiments comprises a track 138 supported within the base 112 upon which the rear wheel support system 116 rests in a manner that permits a student rider to move the rear wheel support system 116 as a whole both forwardly and rearwardly to accommodate vehicles of differing wheel base lengths. For instance, a motorcycle with a greater separation between wheels than another motorcycle can be supported on the automated training system by simply adjusting the position of the track 138. In some embodiments, the rear wheel support system 116 further comprises a frame 140 for supporting the rear wheel support system 116 in a moveable fashion on the track 138. In some embodiments, the rear wheel support system 116 can be moved forwardly and rearwardly by an included adjustment means for permitting backward and forward movements within the track 138.

In some embodiments, the rear wheel support system 116 comprises a plurality of rollers comprising a first set of rollers 142 positioned laterally across a portion of the base and generally perpendicular to the longitudinal axis of the vehicle and a second set of rollers 144 positioned at an angle relative to the top surface of the base 112 to secure the sides of the rear wheel as it rotates to preclude lateral movement of the rear wheel during operation. In some embodiments, the first set of rollers 142*a* and 142*b* are configured to directly support the rear wheel of the vehicle in a manner such that the first set of rollers spin as the rear wheel rotates when power is applied by the student rider seated on the motorcycle. At least one of the rollers in the first set of rollers is associated with a sensor for detecting the speed of the rear wheel's rotation by sensing the speed of rotation of the roller associated with the sensor. In some embodiments, the second set of rollers 144a and 144b are supported on brackets supported on the base 112. In some embodiments, the brackets are configured to be adjustable to accommodate rear wheels of differing widths.

Figure 19:
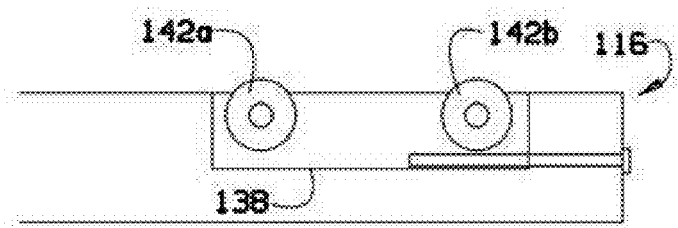
FIG. 19 shows an example embodiment of a rear wheel support assembly for use with at least some embodiments of the present invention.

FIG. 19 conceptually illustrates an example rear wheel support system 116. As shown, the rear wheel support system 116 comprises a pair of rollers 142 in a track 138 and an assembly adjustment pin that provides means for adjusting backward and forward movements within the track 138. Thus, the rear roller assembly of some embodiments is adjustable for different wheel based motorcycles. All that is needed in some embodiments is to turn the threaded rod that is affixed to the roller carriage. In some embodiments, two threaded rods are used.

Referring back to FIG. 12, the vehicle frame position control system 118 of some embodiments controls the vertical orientation of the vehicle on the base 112. The vehicle frame position control system 118 is configured to permit a vehicle user to lean the vehicle to one side or the other during simulation. In some embodiments, the vehicle frame position control system 118 is further configured to resist leaning depending upon certain modes of operation and/or to adjust the position of the frame laterally depending upon certain modes of operation. In some embodiments, the vehicle frame position control system 118 comprises a first cylinder 182 that houses a piston 184. The cylinder 182 is configured to permit reciprocating movement of the piston 184 within the cylinder. The vehicle frame position control system 118 further comprises a frame 134 mechanically rotatably linked to the piston 184 and to a cross-bar 132 configured to be attached to the frame of the vehicle so that as the piston 184 is actuated reciprocally, lateral force is applied to the frame of the vehicle to resist leaning by the rider or to right the frame to the position that simulates what position the vehicle would be in under real-road conditions. In certain modes of operation, the user's leaning of the vehicle causes the frame to push against cross-bar 132 and direct linear movement of the piston 184 within the cylinder 182. Associated with the rear wheel support system 116 is a sensor that detects the vertical position of the vehicle, either directly by having the sensor linked to the frame, or indirectly by having the sensor linked to the position of the piston 184 within the cylinder 182. The vehicle frame position control system 120 is, therefore, preferably configured to receive a signal from the frame position sensor so that the orientation of the vehicle with respect to a vertical plane may be detected and readjusted as the simulation program requires or defines. The electronic communication of the cylinder with the controller may be as described above in association with the embodiment of FIG. 9, or another arrangement as desired by a person of ordinary skill in the art.

In some embodiments, the base 112 or track 138 includes slotted mounts. By moving the cylinder and piston in the slotted mounts, adjustments can be made for different wheel base motorcycle. The adjustable roller carriage, the cylinder, and the piston can be adjusted separately in some embodiments.

Figure 18:
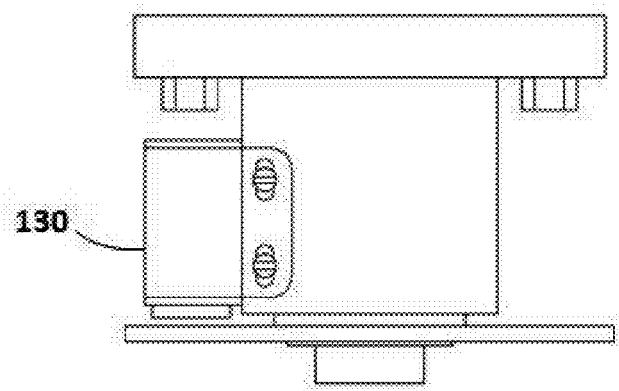
FIG. 18 shows an example embodiment of a motor for use with at least some embodiments of the present invention.

FIG. 18 conceptually illustrates an example motor for actuating a vehicle frame position control system of some embodiments. The motor in some embodiments is mounted on the first cylinder 182. In other embodiments, the motor is mounted to the base 112. The motor provides power to the reciprocating piston as indicated by the control system 120.

The control system 188 of some embodiments is configured to process information gathered from one or more of the sensors and includes a program that is configured to simulate realistic operation of the vehicle as if it were being operated on a road or dirt pathway. In some embodiments, the program is configured to actuate one or both of the front wheel resistance means and the piston within the cylinder depending upon the speed of the rear wheel rotation and the radial position of the front wheel at any one time. In some embodiments, the control system 120 is configured to take into consideration the length of the vehicle, the weight of the rider and the width of the rear wheel tire in presenting a realistic simulation of vehicle operation.

Figure 20:
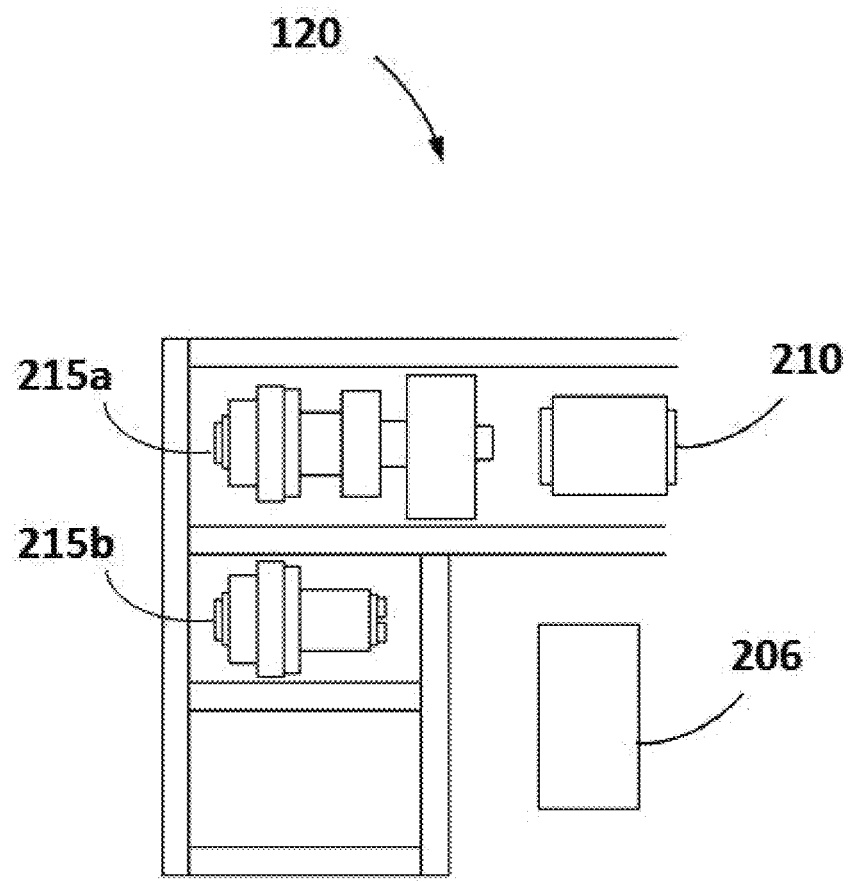
FIG. 20 shows [to be filled in by Stephen when LZ finishes drawing]

Referring to FIG. 20, in some embodiments, the control system 120 comprises a microprocessor 206 that is configured to control actuation of certain movements of the vehicle during a simulated motorcycle ride. The control system 120 may further comprise a transformer 210 and a plurality of relays 215a, 215b. If desired, means for storing detection data and historical vehicle position and/or speed data may also be employed (not shown) so that the training may be enhanced by reviewing exactly what transpired during the simulated ride. In some cases, such storing means may be employed to send such information to a display screen viewable by the rider, either in the form of raw data or transformed into graphic data set against a hypothetical location. With such an arrangement, the rider is provided with an enhanced sensory experience during the simulation session.

The microprocessor 206 is preferably configured to receive input from one or more of a plurality of sensors, including at least a front location sensor for identifying a radial position of the front wheel (handlebars), a rear speed sensor located at the back wheel of the vehicle and used to capture the rear wheel speed, and a sensor for detecting the vertical position of the vehicle (i.e., whether it is at true vertical position or leaning left or right to a certain degree). Preferably, the plurality of sensors are positioned around the vehicle to detect certain attributes of the vehicle speed and component position in order to permit the controller to drive counter forces (via the servo-motor or the frame position cylinder, for example) to the vehicle to simulate how the vehicle would react under real-road conditions. In some applications, the controller is configured to limit the radial position of the front wheel and the degree to which the vehicle leans based upon the rear wheel speed, where such limits may be quantitatively set. For example, the controller may control actuation of the front wheel support system, via the servo motor, to limit radial movement to no more than 15 degrees from the longitudinal axis of the vehicle. It is important to note that such a controller may be employed in association with a hydraulically-actuated simulation system, where a plurality of sensors are positioned around the vehicle to detect certain attributes of the vehicle speed and component position in order to permit the controller to drive counter forces to the vehicle to simulate how the vehicle would react under real-road conditions. In other words, the mechanism of actuation for applying counter forces is not dependent upon when a controller is employed. The sophistication of the simulation system made by modified as desired by the manufacturer to a great and lesser degree of real-world simulation. The feedback loops described herein are simply examples of such control systems may be applied.

Figure 13:
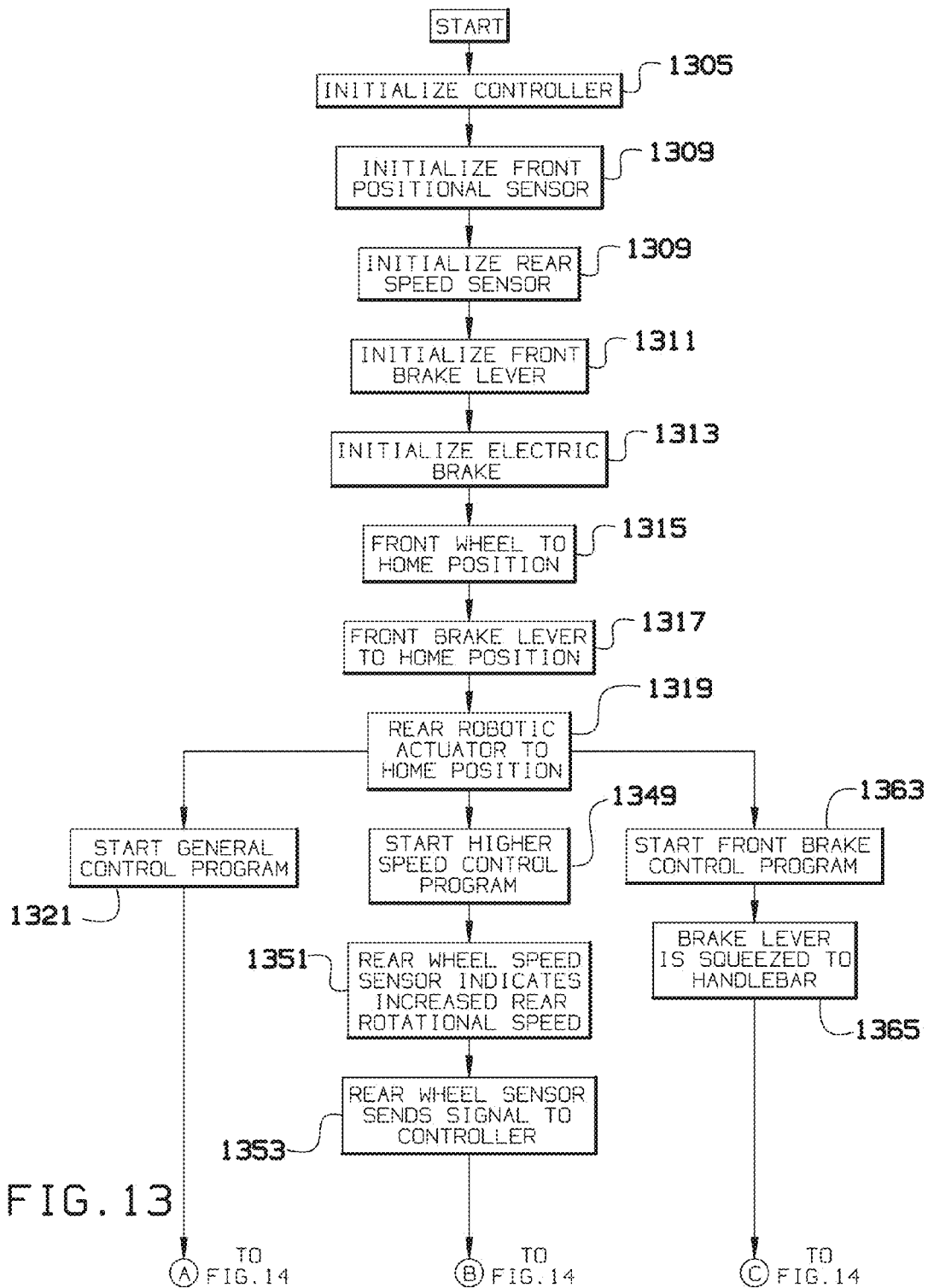
FIGS. 13-15 show a flow chart of an yet another methodology of use of at least some embodiments of the present invention
Figure 14:
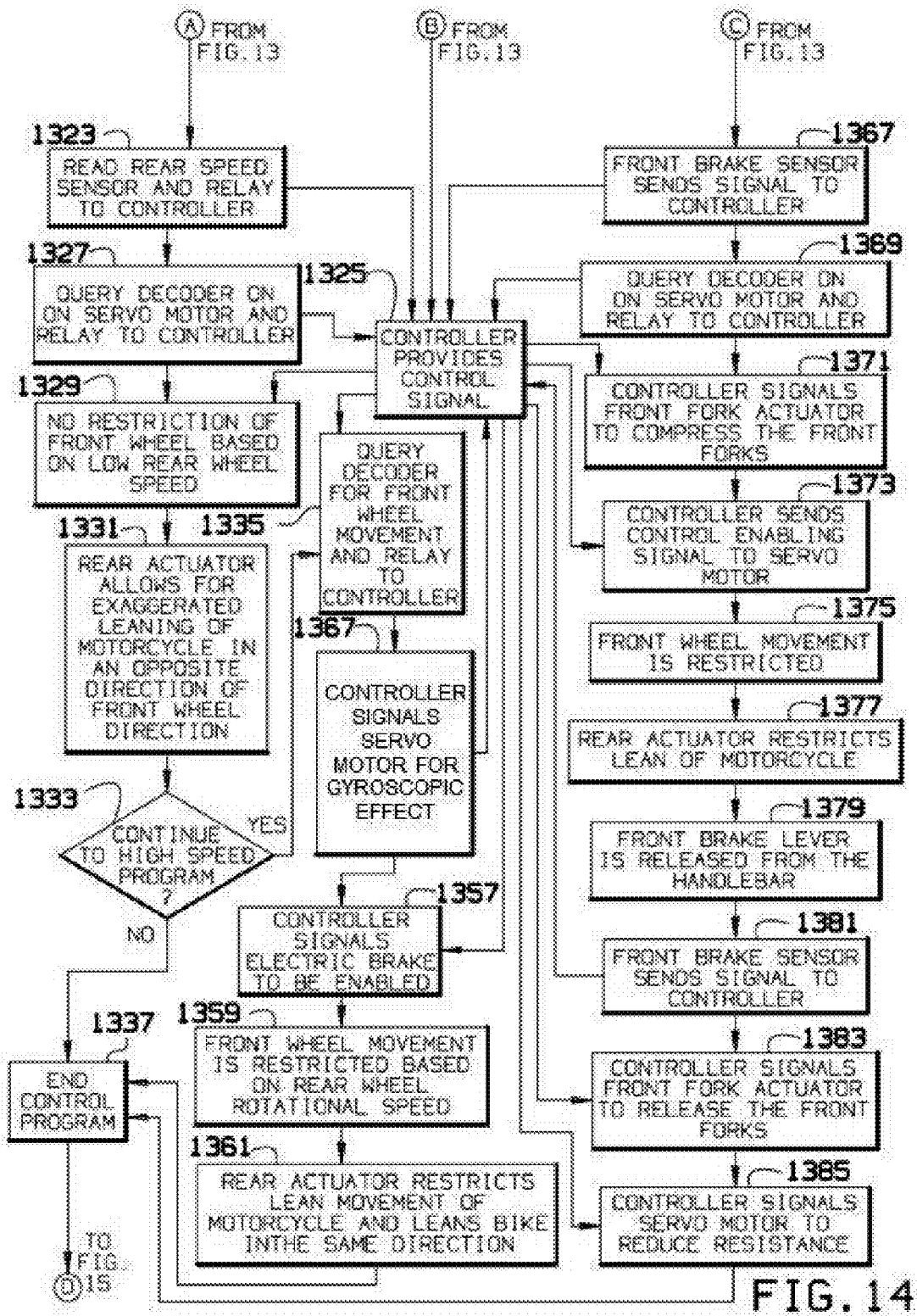
Figure 15:
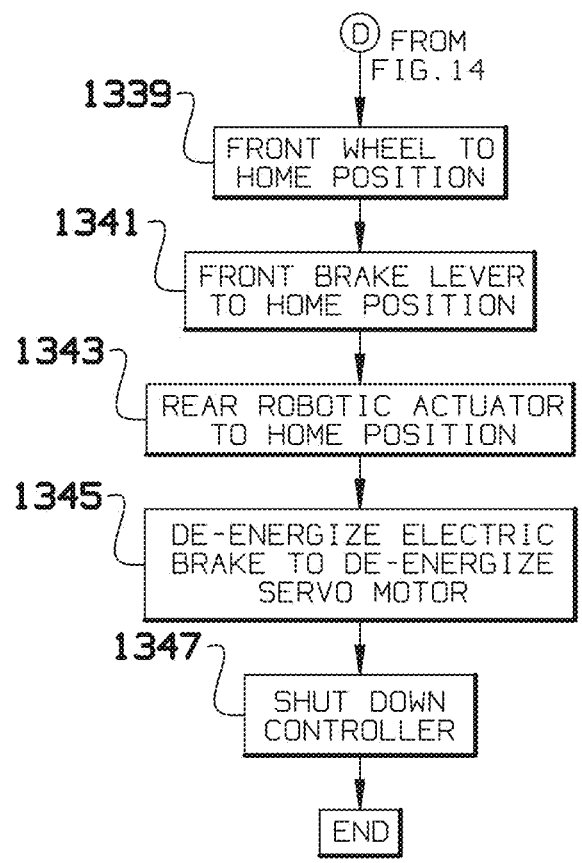

In some embodiments, the front pivot point comprises a control joint that allows the motorcycle to have the front wheel turn left to right and back. The control joint of some embodiments also lets the front wheel lean side to side at the same time as the front wheel turns. FIGS. 13-15 conceptually illustrate a detailed process 1300 for operating an automated training system having an electronic actuator in some embodiments. The process 1300 is performed by the automated training system when a fully functional two-wheeled vehicle stationed on the training system is operated by a person, such as a student learning to ride a motorcycle. In some cases, operations described by reference to FIG. 11 are further described in detail for the process 1300 in FIGS. 13-16.

The process 1300 starts by initializing (at 1305) the controller. This operation is similar to step 1110 of FIG. 11, for initializing the electronic controller. As noted above, the electronic controller of some embodiments is a logical processing component of the automated training system. In particular, the electronic controller of some embodiments is a multi-axis controller that can receive and process multiple inputs and output corresponding reactive control movement signals. In some embodiments, the electronic controller includes a microprocessor that controls the motorcycle movements during simulated operation. To initialize the electronic controller, the process 1300 performs a number of individual component initializations. In some embodiments, the individual component initializations are performed in sequence, while in other embodiments, the component initializations are performed at approximately the same time. The following set of initializations is performed by the process 1300 for the automated training system of some embodiments.

The process initializes (at 1307) the front positional sensor. As noted above, the radial turning position is set to a default position of 0 degrees in some embodiments. The wheel is therefore set to a straight-forward position. The process then initializes (at 1309) the rear speed sensor. At a starting speed of zero, a rider will be in a position, once seated on the motorcycle, to accelerate to some higher speed. In some embodiments, the unit of measure is configurable to be one of miles per hour (MPH) and kilometers per hour (KPH).

Next, the process 1300 initializes (at 1311) the front brake lever. In some embodiments, the automated training system has a microprocessor controlled electronic actuator that mounts to the front forks of the motorcycle. The actuator compresses the front forks to simulate front braking weight transfer and fork compression. When the brake lever is squeezed to the handle bar in some embodiments, a sensor relays the movement to the microprocessor. The microprocessor signals the electronic actuator to compress the forks. Later when the front brake lever is released, the actuator receives a signal from the microprocessor to allow the forks to rebound to the static position. This allows for a realistic feeling of the weight transfer that occurs as you apply the front brake while riding on the street.

The process proceeds to initialize (at 1313) the electric brake. In some embodiments of the automated training system having a front pivot point, there is also an electric disk brake, which when an appropriate or pre-designated speed is achieved at the rear wheel, activates and restricts the rotational steering action from the handle bars. By restricting the front wheel movement, the rider gets the simulated feeling that would be experienced while riding on the road at speed. The process next sets (at 1315) the front wheel to the home (or default) position. As described above, the motorcycle starts with a front wheel alignment that is straight forward. From this default position, the rider can turn the handle bars a certain radial distance in either direction in order to turn the motorcycle. For example, the rider turns the wheel 15 degrees right to make a sharp right turn, and then turns back to straight position for a ride until finally turning 3 degree left for a slight turn to the left. No matter what radial position the handlebars are in at any given moment, the automated training system knows the home front wheel position, and therefore, can calculate any turn offset to simulate the appropriate feeling a rider would sense for the same turn on a real road.

The process next sets (at 1317) the front brake lever to the home (or default) position. The front brake lever defaults to a position with no force applied to the brakes. Thus, the automated training system does not start in a braking position, even though the motorcycle does not actually move forward or backward when secured to the base 112 of the system. Next, the process 1300 sets (1319) the rear electronic actuator to the home (or default) position. As noted above, the rear actuator receives commands from the electronic controller in order to move the motorcycle in ways that simulate an actual motorcycle ride.

After the process 1300 completes the initialization of the controller (i.e., as described in steps 1305-1319), the process then proceeds to start various control programs for operating the automated training system in a way that simulates a real riding experience. In some embodiments, a plurality of control programs comprising a general control program, a higher speed control program, and a front brake control program start approximately at the same time. In other embodiments, each of the control programs start at different times, according to different triggers which cause the control programs to start in response to different events. In order not to over complicate the description with unnecessary detail, the descriptions of the control programs are described individually, even in cases where the automated training system employs a set of triggers to launch one or more control programs at different times. As a person of skill in the art would understand, the flow of the control programs can occur in any of several different sequences of steps. Therefore, the following description is provided for illustration and not limitation.

For the general control program, as shown in FIG. 13, the process starts (at 1321) the general control program after all initializations are complete. The process next reads (at 1323) the rear speed sensor and relays the signal to the electronic controller. In general operation, the electronic controller of the automated training system receives sensor inputs from one or more of the sensors (such as the rear speed sensor), and sends corresponding signals that represent commands to actuators that are responsive to the inputs. For instance, when the student is seated on the motorcycle and accelerates from zero to some speed level, the motorcycle actually rotates the rear wheel in accordance with the acceleration prompted by the student increasing the speed, and the sensors of the automated training system then gather input based on the accelerating speed, such that the rear speed sensor captures speed data and sends it to the microprocessor of the electronic controller.

Once the speed sensor data is captured, the process then transitions to 1325 in which the electronic controller provides a control signal. As noted above, the electronic controller processes the speed data and sends commands to various actuators and systems to update. For instance, the electronic controller, upon receiving sensory input that the speed has changed from zero to some speed, may send a signal to a display device mounted on the front of the motorcycle in order to display a simulated landscape appearing to move in real time with the accelerating motorcycle. This display enhances the kinesthetic feedback that the automated training system provides to the rider by including a visual that actually showing what a motorcycle ride might appear like in real time. The electronic controller thus has the ability to communicate with a plurality of actuators and components to provide responsive motorcycle movement based on sensor data it captures.

After reading the rear speed sensor, the process next reads (at 1327) the front positional sensor to determine radial movement of the handlebars. The captured radial position data is thereafter transmitted to the electronic controller (at 1325) for responsive processing. In some embodiments, when the speed of the two-wheeled vehicle is below a threshold speed, no movement constraints are applied, but once the vehicle is moving faster than the threshold speed, the system applies one or more constraints to one or more components. In this example, the speed is below a threshold, so the electronic controller does not constrain the handlebars. Therefore, the process transitions to 1329 in which no restriction of front wheel occurs, based on the low rear wheel speed.

On the other hand, if the speed of the rear wheel was determined to be above the threshold speed, the process would then transition to 1335 to start the higher speed control program. As an example, the electronic training system may set a threshold speed of 12 MPH, such that speeds that exceed 12 MPH are sensed, causing the high speed control program to start, while speeds up to 12 MPH will not trigger the start of the higher speed control program.

Referring back to the example in which the rear speed does not exceed the threshold speed, the process next transitions to 1331 in which the rear actuator allows for exaggerated leaning of the motorcycle in an opposite direction of the front wheel direction. At this point, the process determines (at 1333) whether or not to continue to the high speed program. When the process determines that the high speed program is now to be started, the process transitions to 1335, which is described above. On the other hand, if the process determines that the high speed program should not be started, then the process ends (at 1337) the general control program. In order to end the general control program, the process resets the positions of a number of components to the default (or home) positions. Thus, the process sets (at 1339) the front wheel its home position (i.e., straight forward), sets (at 1341) the front brake lever to the home position (e.g., released, or not compressed), sets (at 1343) the rear actuator to the home position, de-energizes (at 1345) the electric brake, and shuts down (at 1347) the electronic controller. The process then ends.

Referring back to FIG. 13, the process starts (at 1349) the higher speed control program at some time after the initialization is finished. Once started, the process transitions to 1351 in which the rear wheel speed sensor indicates an increase in the rear wheel rotational speed. The process then captures (at 1353) the rear wheel signal from the rear wheel sensor which is sent to the controller in some embodiments. The process then transitions to 1325 where the electronic controller provides a control signal corresponding to the rear wheel sensor signal. As the sensor in this case captured an increase in speed, the process next starts (at 1335) the higher speed control program. Once the higher speed control program is started, the process transitions to 1355 to read the front positional sensor movement and relay this to the controller.

In some embodiments, the front positional sensor assists in determining the restricting movement of the front wheel (and handlebars) at speeds above a certain "threshold speed" limit (e.g., 12 MPH), which is determined from the rear wheel speed sensor. A restricted handle bar movement at the front wheel is used to simulate the gyroscopic stability induced by the rotating front wheel at threshold speed or higher. An electronic brake mounted to the automated training system is used to limit the left/right movement of the handle bar; again simulating gyroscopic stability of the front wheel in some embodiments.

Next, the process transitions to 1357 in which the controller signals for the electric brake to be applied, and to 1359, in which the front wheel movement (i.e., handlebar movement) is restricted based on the rear wheel rotational speed. By limiting the front wheel movement, the front handlebar movement is also limited. In this way, the automated training system can simulate gyroscopic stability, in combination with the servo motor. The handle bar movement restriction is an incrementally graduated process in some embodiments. As the rear wheel speed increases, there is an incrementally proportional change in the front wheel movement. The higher the rear wheel speed, the less the handle bar turns to left/right. Also, as there is an incrementally proportionally controlled restriction of the left/right lean of the motorcycle via the rear actuator. At the higher speeds of above 12 MPH, the rear actuator is given a control signal from the controller, to follow the directional input of the front wheel.

The rear wheel, at speed, creates that stability without the use of the servo motor, because it is a direct byproduct of the rotational speed on the roller assembly. As the measured rear wheel rotational speed exceeds certain speeds (e.g., 35 MPH), the controller signals the servo motor to limit the handlebar left and right turns to very small radial offsets (almost no turn angle as speed increases). The controller also sends counter-steering and lean holding signals to the rear actuator. This is illustrated in FIG. 14 by the rear actuator restricting the lean movement of the motorcycle when the process transitions to 1361, and results in leaning the bike in the same way. Then the process ends (at 1337) the control program, as described above.

For the front brake control program, the process 1300 transitions to 1363 at some time after the initializations are completed. The front brake control program depends on a brake sensor that in some embodiments is affixed to the front forks of the motorcycle, while in other embodiments is present in the servo motor. The front brake control program imposes a number of constraints on the automated training system, as described below. When the brake lever is squeezed to the handlebar, in some embodiments, the process transitions to 1365 and 1367 in which the controller receives signal feedback from sensors to control gyroscopic effect. The process can transition to 1325, as described above. The process also reads (at 1369) the front positional sensor movement and relays the positional data to the electronic controller. The process can transition to 1325, as described above. At 1371, the process includes a step in which the controller signals the front fork actuator to compress the front forks. The process also (at 1373) causes the controller to signal the electric break to enabled, the front wheel movement (at 1375) to be restricted, the rear actuator (at 1377) to restrict the lean of the motorcycle, the front brake lever (at 1379) to be released from the handlebar, the front brake sensor (at 1381) to send a signal to the controller, the controller (at 1383) to signal the front fork actuator to release the front forks, and the controller (at 1385) to signal the electric brake to be disabled. Then the process transitions to 1337 to end the control program, as described above.

While the example flow described by reference to FIGS. 13-15 is only one flow through a riding session, a person of skill in the art would appreciate that the steps can change for any given riding session, as needed based on sensor data that is captured and the feedback responses that are output. This is especially true because the automated training system uses an actual operational motorcycle, with a set of controls (full set or limited set of controls). Thus, the motorcycle is permitted to lean and turn in life-like manners (i.e., as expected on street or dirt path).

While many of the examples described by reference to FIGS. 11-19 above focus on leaning, braking, and accelerating maneuvers that a student rider can learn in a safe and controlled environment by using the automated training system, many other types of motorcycle operations are possible. For instance, the automated training system allows the rider to learn to shift the transmission gears, learn the smooth controlled operation of the clutch, and brakes, and their interplay and impact on riding. Likewise, the rider can learn to control the throttle while shifting the motorcycle transmission.

In some embodiments, a touchscreen interface is mounted to a fixed position on the device to allow for access to several different situational programs which have all been written exclusively for the specific control of the combination of sensors, controllers, and speed variable for this training system. By tying an electronic control system together with a set of sensors and actuators, the automated training system can provide a simulated riding experience on a real motorcycle. Further enhancements are conceived in which some embodiments have the ability to export the digital control and positional sensor signals to allow for visual screen interface. The interface would allow a user to 'see' a simulated street or track situation and respond to the simulation. Moreover, some embodiments have a L.E.D. mounted to the device that would show a 'fault' or 'error' in perceived riding techniques.

In addition, some of the embodiments are equipped with an electronically controlled actuator that is mounted to the front forks of the motorcycle. The forks are proportionally compressed, matching the movement of the front brake lever to simulate front braking when given the control signal from the electronic controller. The controller receives the 'braking' signal from a sensor located on the handle bar that register movement of the brake lever on the bike. The front mounted actuator can also simulate a rise in the pavement or an increase in simulated forward speed.

The above-described embodiments of the invention are presented for purposes of illustration and not of limitation. For instance, the automated training system can be used for game simulation in some cases. By attaching sensors to all the moving parts of a vehicle or moving apparatus, the sensors could drive software that would enable the user to ride a simulated race track to road course. Moreover, many embodiments include examples that are described in relation to paved surface motorcycle training, yet the features of these embodiments are adaptable to many other single-track two-wheeled vehicles capable of achieving significant velocities (e.g., mopeds, racing bikes, dirt bikes, etc.). Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An automated training system configured for use with two-wheeled automotive vehicles, the system permitting a user to operate a two-wheeled automotive vehicle on the system in a manner that simulates actual operation on a road or dirt pathway, the system incorporating kinesthetic sensory input to a person seated on and operating the automotive vehicle as part of an effort to learn how to operate the automotive vehicle safely and effectively in a controlled off-road environment, the automated training apparatus comprising:

a base configured to support a two-wheeled automotive vehicle in a manner that permits operation of the vehicle but precludes forward movement of the vehicle during operation;

a front wheel support system comprising a cradle for securing the front wheel of the two-wheeled automotive vehicle in a manner that supports the front wheel while permitting the user to turn the front wheel radially during operation, the front wheel support system further comprising a sensor for detecting the radial position of the front wheel relative to the frame of the vehicle, and a system for applying resistance against radial movement of the front wheel during certain modes of operation;

a rear wheel support system that secures the rear of the motorcycle and allows the rear wheel to rotate as power is applied by the user to the vehicle, the rear wheel support system comprising a track supported within the base upon which the rear wheel support system may rest in a manner to that permits a user to move the rear wheel support system as a whole forwardly and rearwardly to accommodate vehicles of differing wheel base lengths, the rear wheel support system comprising a plurality of rollers, a first set of rollers having a first roller placed in front of a second roller, with the first set of rollers positioned laterally across a portion of the base and generally perpendicular to the longitudinal axis of the vehicle, the first set of rollers configured to directly support the rear wheel of the vehicle in a manner such that the first set of rollers spin as the rear wheel rotates when power is applied by the user, at least one of the first set of rollers associated with a sensor for detecting the speed of the rear wheel's rotation by sensing the speed of rotation of the roller associated with the sensor, a second set of rollers having a third roller and a fourth roller positioned between the first roller and the second roller, the second set of rollers positioned at an angle relative to the top surface of the base to secure the sides of the rear wheel as it rotates to preclude lateral movement of the rear wheel during operation, the set of rollers supported on brackets supported on the base, where the brackets are configured to be adjustable to accommodate rear wheels of differing widths;

a vehicle frame position control system that controls the vertical orientation of the vehicle on the base, the vehicle frame position control system configured to permit a vehicle user to lean the vehicle to one side or the other during simulation, the vehicle frame position control system further configured to resist leaning depending upon certain modes of operation and/or to adjust the position of the frame laterally depending upon certain modes of operation, the vehicle frame position control system comprising at least a first cylinder housing a piston therein, the cylinder configured to permit reciprocating movement of the piston within the cylinder, the vehicle frame position control system further comprising a frame mechanically linked to the piston and to a cross-bar directly attached to the frame of the vehicle so that as the piston is actuated, force is applied to the frame of the vehicle in certain modes of operation, while in other modes of operation, the user's leaning of the vehicle causes linear movement of the piston within the cylinder, the vehicle frame position control system further comprising a sensor for detecting the position of the piston relative to the cylinder so that the orientation of the vehicle with respect to a vertical plane may be sensed; and a control system configured to process information gathered from one or more of the sensors and configured to be programmed to simulate realistic operation of the vehicle as if it were being operated on a road or dirt pathway, the program configured to actuate one or both of the front wheel resistance means and the piston within the cylinder depending upon the speed of the rear wheel rotation and the radial position of the front wheel at any one time, the control system configured to take into consideration the length of the vehicle, the weight of the rider and the width of the rear wheel tire in presenting a realistic simulation of vehicle operation.

2. The automated training system of claim 1, further comprising a touch screen interface, communicatively coupled to the control system and programmed with instructions to actuate of the piston within the cylinder.

3. The automated training system of claim 1, further comprising an electronic actuator configured to actuate the piston within the cylinder, and wherein the piston comprises helical threads engaging a worm gear linked to the electronic actuator to permit incremental reciprocation of the piston with the cylinder in response to feedback from the control system.

4. The automated training system of claim 1, wherein the system for applying resistance is a servo-motor configured to both detect the radial position of the front wheel and to apply resistance in response to feedback from the control system.

5. The automated training system of claim 1, wherein the control system is configured to be programmed to direct actuation of the servo-motor and the piston to set the vehicle in a position conforming to the correct position of the vehicle corresponding to the speed of the vehicle as reflected by the rear wheel rotation speed.

6. The automated training system of claim 1 further comprising a turn table, joined to the base, and further connected to a multi-directional swivel joint; an adjustable wheel chock, attached to the turn table and configured to restrain the front wheel.

7. The automated training system of claim 1 further comprising an electric disk brake connected to the multi-directional swivel joint, wherein the sensor for detecting the speed of the rear wheel's engages the electric disk brake and limits turning of the front wheel support system when an appropriate or pre-designated speed is achieved at the rear wheel.

* * * * *